US012610267B2

(12) United States Patent
Lee et al.

(10) Patent No.: US 12,610,267 B2
(45) Date of Patent: Apr. 21, 2026

(54) APPARATUS AND METHOD FOR CONFIGURING CROSS-LINK INTERFERENCE RESOURCE IN A FULL-DUPLEX COMMUNICATION SYSTEM

(71) Applicant: Samsung Electronics Co., Ltd., Suwon-si (KR)

(72) Inventors: Kwonjong Lee, Suwon-si (KR); Sundo Kim, Suwon-si (KR); Sangwon Jung, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 18/194,964

(22) Filed: Apr. 3, 2023

(65) Prior Publication Data

US 2024/0292251 A1 Aug. 29, 2024

(30) Foreign Application Priority Data

Feb. 28, 2023 (KR) ........................ 10-2023-0026597

(51) Int. Cl.
*H04W 24/10* (2009.01)
*H04B 17/318* (2015.01)
*H04B 17/336* (2015.01)

(52) U.S. Cl.
CPC .......... *H04W 24/10* (2013.01); *H04B 17/318* (2015.01); *H04B 17/336* (2015.01)

(58) Field of Classification Search
CPC .... H04W 24/10; H04B 17/318; H04B 17/336
See application file for complete search history.

(56) References Cited

U.S. PATENT DOCUMENTS

2020/0169341 A1* 5/2020 Hwang ............... H04B 17/318
2020/0228213 A1* 7/2020 Masal ........................ H04L 5/14
(Continued)

FOREIGN PATENT DOCUMENTS

KR 10-2022-0086600 A 6/2022
KR 10-2024-0047695 A 4/2024
(Continued)

OTHER PUBLICATIONS

IEEE Access, Interference Mitigation for Non-Overlapping Sub-Band Full Duplex for 5G-Advanced Wireless Networks Xianghui Han, Ruiqi Liu, (Member, IEEE), Xing Liu, Chunli Liang, Xingguang Wei, Yupeng Hao, Zhaotao Zhang , And Shi Jin (Year: 2022).*
(Continued)

*Primary Examiner* — Deepa Belur
(74) *Attorney, Agent, or Firm* — Jefferson IP Law, LLP

(57) ABSTRACT

The disclosure relates to a $5^{th}$ generation (5G) communication system or a $6^{th}$ generation (6G) communication system for supporting higher data rates beyond a $4^{th}$ generation (4G) communication system such as long term evolution (LTE). A method performed by a base station in a wireless communication system is provided. The method includes identifying a first terminal for measuring a cross-link interference (CLI)-reference signal (RS) and a plurality of terminals for transmitting CLI-RSs, determining a plurality of groups including at least one CLI-RS resource, transmitting, to the first terminal, information on the determined plurality of groups, transmitting, to a second terminal among the plurality of terminals, configuration information on a group of CLI-RS resources corresponding to the second terminal, and receiving, from the first terminal, a CLI measurement result which is measured based on the configuration information on the group of the CLI-RS resources.

12 Claims, 15 Drawing Sheets

(56)                    References Cited

U.S. PATENT DOCUMENTS

| | | | |
|---|---|---|---|
| 2020/0275298 A1 | 8/2020 | Xu et al. | |
| 2022/0116129 A1* | 4/2022 | Ying | H04B 17/345 |
| 2023/0344490 A1 | 10/2023 | Kang et al. | |
| 2024/0089019 A1* | 3/2024 | Xu | H04B 17/328 |
| 2025/0226898 A1* | 7/2025 | Xiong | H04L 27/261 |

FOREIGN PATENT DOCUMENTS

| | | | |
|---|---|---|---|
| WO | 2020/164063 A1 | 8/2020 |
| WO | 2022/056819 A1 | 3/2022 |
| WO | 2022/060014 A1 | 3/2022 |

OTHER PUBLICATIONS

Vivo, Potential enhancements on dynamic/flexible TDD, 3GPP TSG RAN WG1 #112, R1-2300452, Athens, Greece, Feb. 27-Mar. 3, 2023.

Intel Corporation, Potential enhancements on dynamic/flexible TDD, 3GPP TSG RAN WG1 Meeting #111 R1-2211399, Toulouse, France, Nov. 14-18, 2022.

International Search Report and written opinion dated Nov. 20, 2023, issued in International Application No. PCT/KR2023/004468.

Intel Corporation, UE-to-UE CLI measurement and reporting, R1-1900489, 3GPP TSG RAN WG1 Ad-Hoc Meeting 1901, Taipei, China, Jan. 12, 2019, XP051576097.

Extended European Search Report dated Mar. 19, 2026, issued in European Patent Application No. 23925474.1.

\* cited by examiner (a): DL/UL Timing aligned
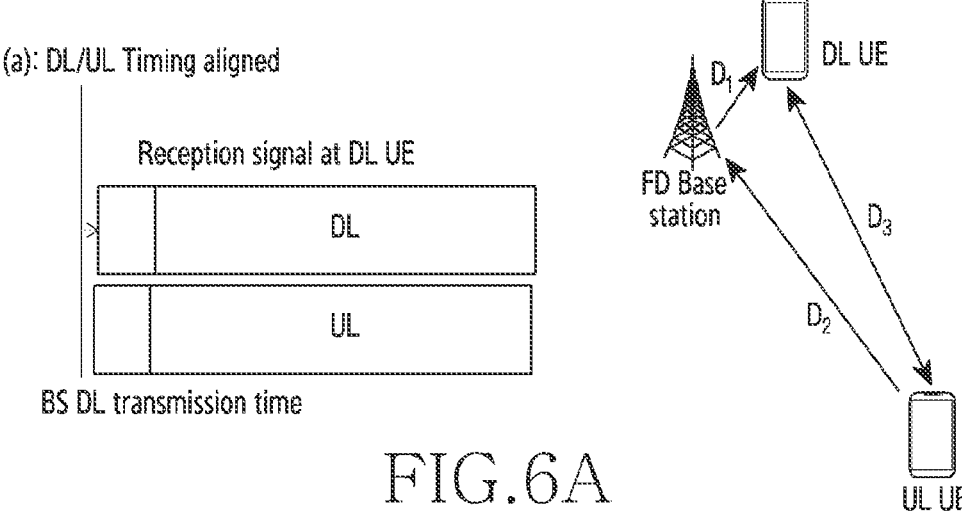
FIG.6A
(b): UL Timing preceding DL
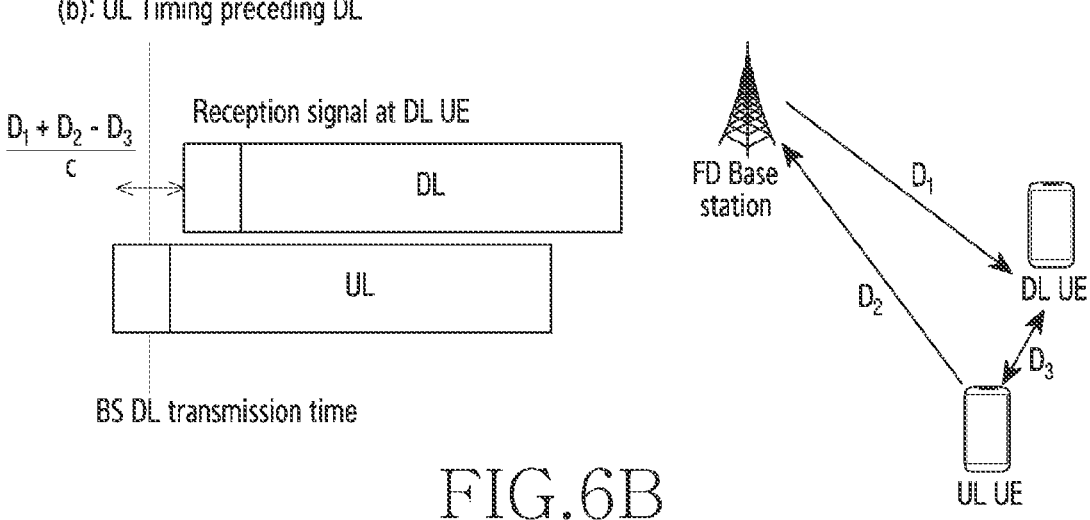
FIG.6B
| Subcarrier spacing (KHz) | 15 | 30 | 60 | 120 | 240 |
|---|---|---|---|---|---|
| CP (µS) | 4.7 | 2.3 | 1.2 (Normal CP), 4.13 (Extended CP) | 0.59 | 0.29 |
| Distance (m) | 1409 | 690 | 360, 1238 | 177 | 87 |
FIG.6C

: VICTIM TERMINAL (CLI MEASUREMENT)

: ATTACKER TERMINAL
  (TRANSMIT SRS, ETC.)

: ATTACKER TERMINAL OF CLI OF
  THRESHOLD VALUE OR MORE

APPARATUS AND METHOD FOR CONFIGURING CROSS-LINK INTERFERENCE RESOURCE IN A FULL-DUPLEX COMMUNICATION SYSTEM

CROSS-REFERENCE TO RELATED APPLICATION(S)

This application is based on and claims priority under 35 U.S.C. § 119(a) of a Korean patent application number 10-2023-0026597, filed on Feb. 28, 2023, in the Korean Intellectual Property Office, the disclosure of which is herein incorporated by reference in its entirety.

BACKGROUND

1. Field

The disclosure generally relates to a wireless communication system. More particularly, the disclosure relates to an apparatus and a method for configuring a resource for a cross-link interference (CLI)-reference signal (RS) to measure interference effectively in a full-duplex (FD) system.

2. Description of Related Art

Considering the development of wireless communication from generation to generation, the technologies have been developed mainly for services targeting humans, such as voice calls, multimedia services, and data services. Following the commercialization of $5^{th}$ generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the $6^{th}$ generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 micro seconds (usec), and thus will be 50 times as fast as 5G communication systems and have the ¹⁄₁₀ radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in millimeter wave (mm-Wave) bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple-input multiple-output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for allowing an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and allowing network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of user equipment (UE) computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In particular, in a system to which a full duplex (FD) technology is applied to allow an uplink (UL) and a downlink (DL) to utilize the same frequency resource at the same time, a base station may transmit and receive UL signals and DL signals with a plurality of terminals concurrently. However, since the same frequency resource is utilized at the same time, the UL signals and the DL signals may be transmitted and received in an overlapping resource area, and respective signals using the overlapping resource area may interfere with one another. In an FD system, an interference occurring between terminals may be referred to as a cross-link interference (CLI). Various technologies for configuring and measuring a CLI-RS resource efficiently are being considered in order to solve the above-described problems and to allow smooth communication between a base station and a plurality of terminals.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effectively transmitting and receiving signals in a wireless communication system.

Another aspect of the disclosure is to provide an apparatus and a method for configuring a CLI-RS in order to minimize an overhead caused by interference measurement between terminals in an FD system.

Additional aspects will be set forth in part in the description which follows and, in part, will be apparent from the description, or may be learned by practice of the presented embodiments.

In accordance with an aspect of the disclosure, a method performed by a base station in a wireless communication system is provided. The method includes identifying a first terminal for measuring a CLI-RS and a plurality of terminals for transmitting CLI-RSs, determining a plurality of groups including at least one CLI-RS resource, transmitting, to the first terminal, information on the determined plurality of groups, transmitting, to a second terminal among the plurality of terminals, configuration information on a group of CLI-RS resources corresponding to the second terminal, and receiving, from the first terminal, a CLI measurement result which is measured based on the configuration information on the group of the CLI-RS resources.

In accordance with another aspect of the disclosure, a method performed by a first terminal in a wireless communication system is provided. The method includes receiving, from a base station, information on a plurality of groups including at least one CLI-RS resource, receiving, from a second terminal, a CLI-RS based on a group of CLI-RS resources corresponding to the second terminal, and transmitting a measurement result on the CLI-RS to the base station, and the first terminal may be a terminal for measuring a CLI and the second terminal may be one of a plurality of terminals for transmitting CLI-RSs.

In accordance with another aspect of the disclosure, a base station in a wireless communication system is provided. The base station includes at least one transceiver, and at least one processor coupled with the at least one transceiver, and the at least one processor may be configured to identify a first terminal for measuring a CLI-RS and a plurality of terminals for transmitting CLI-RSs, determine a plurality of groups including at least one CLI-RS resource, transmit, to the first terminal, information on the determined plurality of groups, transmit, to a second terminal among the plurality of terminals, configuration information on a group of CLI-RS resources corresponding to the second terminal, and receive, from the first terminal, a CLI measurement result which is measured based on the configuration information on the group of the CLI-RS resources.

In accordance with another aspect of the disclosure, a first terminal in a wireless communication system is provided. The first terminal includes at least one transceiver, and at least one processor coupled with the at least one transceiver, and the at least one processor may be configured to receive, from a base station, information on a plurality of groups including at least one CLI-RS resource, receive, from a second terminal, a CLI-RS based on a group of CLI-RS resources corresponding to the second terminal, and transmit a measurement result on the CLI-RS to the base station, and the first terminal may be a terminal for measuring a CLI and the second terminal may be one of a plurality of terminals for transmitting CLI-RSs.

The disclosure provides an apparatus and a method for effectively providing a service in a wireless communication system.

The disclosure provides an apparatus and a method for effectively transmitting and receiving signals in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6A, 6B, and 6C are a view illustrating situations in which a CLI is measured according to various embodiments of the disclosure;

Throughout the drawings, it should be noted that like reference numbers are used to depict the same or similar elements, features, and structures.

DETAILED DESCRIPTION

Figure 1:
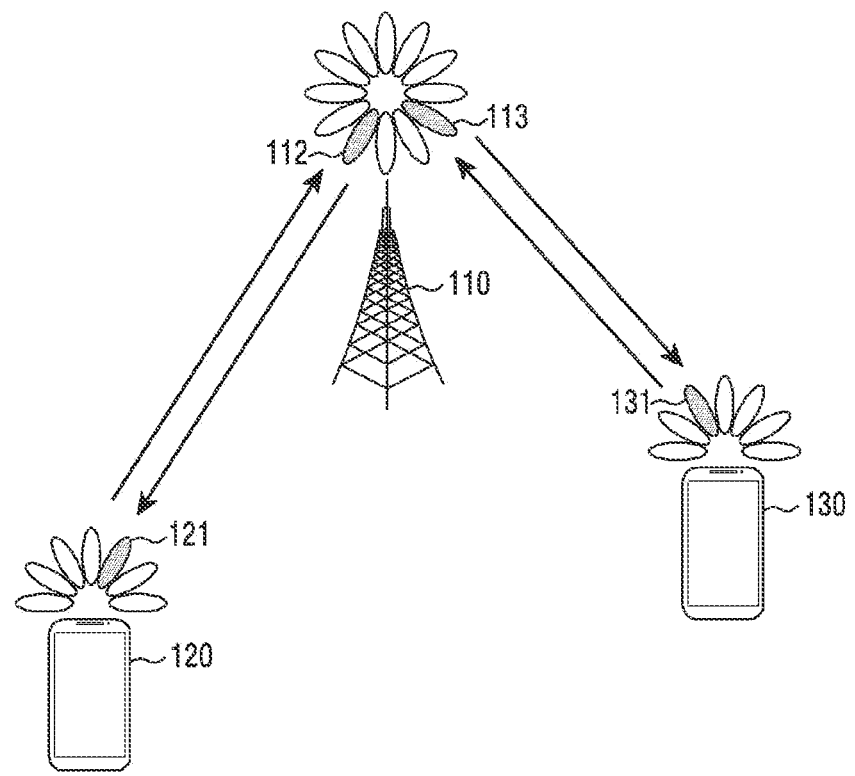
FIG. 1 is a view illustrating a wireless environment network in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure described below, hardware-wise approach methods will be described by way of an example. However, various embodiments of the disclosure include technology using both hardware and software, and thus do not exclude software-based approach methods. In addition, terms indicating network entities, terms indicating components of an apparatus are merely examples for the convenience of explanation. Accordingly, the disclosure is not limited to the terms which will be described below, and other terms having the same technical meanings may be used.

In addition, various embodiments will be described by using terms used in some communication standards (for example, 3$^{rd}$ generation partnership project (3GPP), European telecommunication standards institute (ETSI)), but these are merely examples for explanation. Various embodiments of the disclosure may be easily modified and applied to other communication systems.

In addition, in the disclosure, the expression "exceeding" or "being less than" may be used to determine whether a specific condition is satisfied, fulfilled, but these are just for expressing one example and do not exclude the expression "being greater than or equal to" or "being less than or equal to." The condition described by "being greater than or equal to" may be substituted with "exceeding," the condition described by "being less than or equal to" may be substituted with "being less than," and the condition described by "being greater than or equal to and less than" may be substituted with "exceeding and less than or equal to."

As used herein, a term indicating a signal, a term indicating a channel, a term indicating control information, terms indicating network entities, terms indicating components of an apparatus are merely examples for the convenience of explanation. Accordingly, the disclosure is not limited to the terms which will be described below, and other terms having the same technical meanings may be used.

FIG. 1 illustrates a wireless environment network in a wireless communication system according to an embodiment of the disclosure. FIG. 1 illustrates a base station 110, a first terminal 120, a second terminal 130 as part of nodes using a wireless channel in a wireless communication system. FIG. 1 illustrates only one base station, but other base stations which are the same as or similar to the base station 110 may further be included.

The base station 110 may be a network infrastructure that provides radio access to the terminals 120 and 130. The base station 110 may have a coverage that is defined as a predetermined geographical region based on a distance by which it transmits a signal. The base station 110 may be referred to as an "access point (AP)," an "eNodeB (eNB)," a "5$^{th}$ generation (5G) node," a next generation nodeB (gNB)," a "wireless point," a "transmission/reception point (TRP)," or other terms having the same technical meaning as the above-mentioned terms, in addition to the base station.

Each of the first terminal 120 and the second terminal 130 is a device that is used by a user, and performs communication with the base station 110 through a wireless channel. In some cases, at least one of the first terminal 120 and the second terminal 130 may be operated without user's intervention. That is, at least one of the first terminal 120 and the second terminal 130 may be a device which performs machine type communication (MTC), and may not be carried by a user. Each of the first terminal 120 and the second terminal 130 may be referred to as "user equipment (UE)," a "mobile station," a "subscriber station," a "remote terminal," a "wireless terminal," a "user device," or other terms having the same technical meaning as the above-mentioned terms, in addition to the terminal.

The base station 110, the first terminal 120 and the second terminal 130 may transmit and receive radio signals in a millimeter wave (mmWave) band (for example, 28 GHZ, 30 GHZ, 38 GHz, 60 GHZ). In this case, the base station 110, the first terminal 120 and the second terminal 130 may perform beamforming in order to enhance a channel gain. Herein, beamforming may include transmission beamforming and reception beamforming. That is, the base station 110, the first terminal 120, and the second terminal 130 may give directivity to a transmission signal or a reception signal. To achieve this, the base station 110 and the terminals 120 and 130 may select serving beams (e.g., serving beams 112 and 121 for the base station and the first terminal 120, respectively, and serving beams 113 and 131 for the base station and the second terminal 130, respectively) through a beam search or beam management procedure. After the serving beams are selected, communication may be performed through resources having a quasi co-located (QCL) relationship with resources through which the serving beams are transmitted.

If large-scale characteristics of a channel which transmits a symbol on a first antenna port can be inferred from a channel which transmits a symbol on a second antenna port, the first antenna port and the second antenna port may be evaluated as having a QCL relationship. For example, the large-scale characteristics may include at least one of delay spread, doppler spread, doppler shift, average gain, average delay, spatial receiver parameter.

Figure 2:
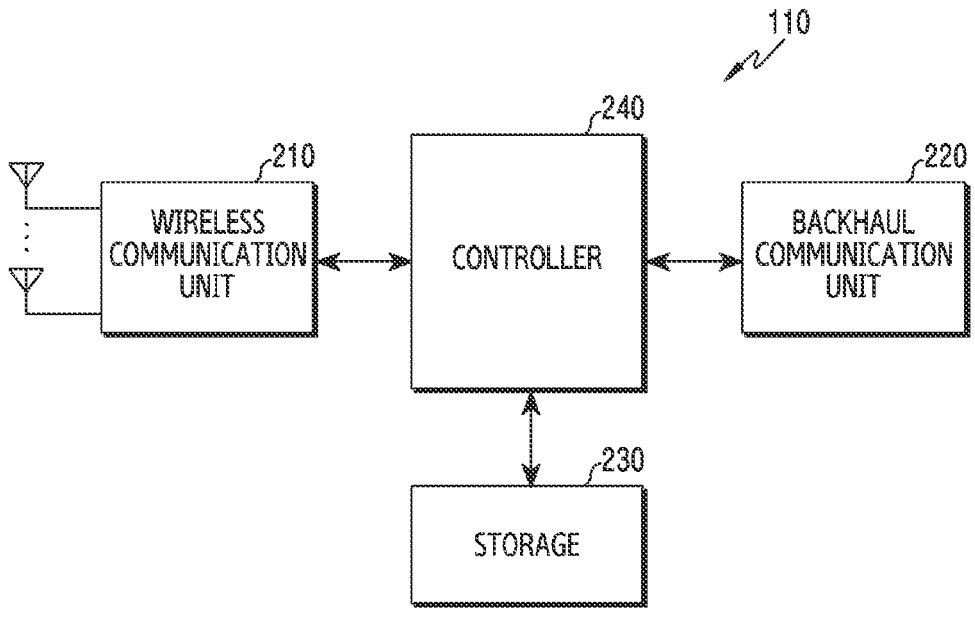
FIG. 2 is a view illustrating a functional configuration of a base station in a wireless communication system according to an embodiment of the disclosure.

FIG. 2 illustrates a functional configuration of a base station in a wireless communication system according to an embodiment of the disclosure. The configuration illustrated in FIG. 2 may be understood as a configuration of the base station 110. The term "unit" or terms ending with suffixes "-er," and "-or" used in the following descriptions refer to a unit processing at least one function or operation, and may be implemented by hardware, software, or a combination of hardware and software.

Referring to FIG. 2, the base station 110 may include a wireless communication unit 210, a backhaul communication unit 220, a storage 230, and a controller 240.

The wireless communication unit 210 performs functions for transmitting and receiving signals via a wireless channel. For example, the wireless communication unit 210 may perform a function of converting between a baseband signal and a bit stream according to a physical layer standard of a system. For example, when transmitting data, the wireless communication unit 210 may generate complex symbols by encoding and modulating a transmission bit stream. In addition, when receiving data, the wireless communication unit 210 may restore a reception bit stream by demodulating and decoding a baseband signal.

In addition, the wireless communication unit 210 may up-convert a baseband signal into a radio frequency (RF) band signal, and then may transmit the signal via an antenna, and may down-convert an RF band signal received via an antenna into a baseband signal. To achieve this, the wireless communication unit 210 may include a transmission filter, a reception filter, an amplifier, a mixer, an oscillator, a digital to analog converter (DAC), an analog to digital converter (ADC), etc. In addition, the wireless communication unit 210 may include a plurality of transmission and reception paths. Furthermore, the wireless communication unit 210 may include at least one antenna array including a plurality of antenna elements.

In the hardware aspect, the wireless communication unit 210 may be configured by a digital unit and an analog unit, and the analog unit may be configured by a plurality of sub-units according to operating power, an operating frequency, or the like. The digital unit may be implemented by at least one processor (for example, a digital signal processor (DSP)).

The wireless communication unit 210 may transmit and receive signals as described above. Accordingly, an entirety or a part of the wireless communication unit 210 may be referred to as a "transmitter," a "receiver," or a "transceiver." In addition, in the following descriptions, transmitting and receiving via a wireless channel may be used as a meaning including processing by the wireless communication unit 210 as described above.

The backhaul communication unit 220 provides an interface for communicating with other nodes in a network. That is, the backhaul communication unit 220 may convert a bit stream to be transmitted from the base station 110 to another node, for example, another access node, another base station, a higher node, a core network, or the like, into a physical signal, and may convert a physical signal transmitted from another node into a bit stream.

The storage 230 may store data such as a basic program for operations of the base station 110, an application program, configuration information, or the like. The storage 230 may be configured by a volatile memory, a nonvolatile memory, or a combination of a volatile memory and a nonvolatile memory. In addition, the storage 230 provides stored data according to a request of the controller 240.

The controller 240 controls overall operations of the base station 110. For example, the controller 240 may transmit and receive signals via the wireless communication unit 210 or the backhaul communication unit 220. In addition, the controller 240 may write and read out data on and from the storage 230. In addition, the controller 240 may perform functions of a protocol stack required by communication standards. According to another implementation example, the protocol stack may be included in the wireless communication unit 210. To achieve this, the controller 240 may include at least one processor.

According to various embodiments, the controller 240 may control the base station 110 to perform operations according to various embodiments which will be described below.

Figure 3:
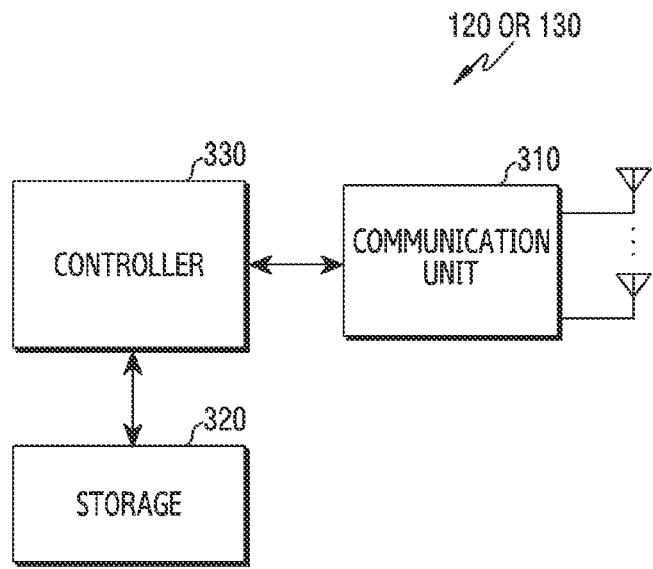
FIG. 3 is a view illustrating a functional configuration of a terminal in a wireless communication system according to an embodiment of the disclosure.

FIG. 3 illustrates a functional configuration of a terminal in a wireless communication system according to an embodiment of the disclosure. The configuration illustrated in FIG. 3 may be understood as a configuration of both of the terminals 120 or 130. The term "unit" or terms ending with suffixes "-er," and "-or" used in the following descriptions refer to a unit processing at least one function or operation, and may be implemented by hardware, software, or a combination of hardware and software.

Referring to FIG. 3, the terminal may include a communication unit 310, a storage 320, and a controller 330.

The communication unit 310 performs functions for transmitting and receiving signals via a wireless channel. For example, the communication unit 310 may perform a function of converting between a baseband signal and a bit stream according to a physical layer standard of a system. For example, when transmitting data, the communication unit 310 may generate complex symbols by encoding and modulating a transmission bit stream. In addition, when receiving data, the communication unit 310 may restore a reception bit stream by demodulating and decoding a baseband signal. In addition, the communication unit 310 may up-convert a baseband signal into an RF band signal, and then may transmit the signal via an antenna, and may down-convert an RF band signal received via an antenna into a baseband signal. For example, the communication unit 310 may include a transmission filter, a reception filter, an amplifier, a mixer, an oscillator, a DAC, an ADC, etc.

In addition, the communication unit 310 may include a plurality of transmission and reception paths. Furthermore, the communication unit 310 may include at least one antenna array including a plurality of antenna elements. In the hardware aspect, the communication unit 310 may be configured by a digital circuit and an analog circuit (for example, a radio frequency integrated circuit (RFIC)). Herein, the digital circuit and the analogue circuit may be implemented as a single package. In addition, the communication unit 310 may include a plurality of RF chains. Furthermore, the communication unit 310 may perform beamforming.

The communication unit 310 may transmit and receive signals as described above. Accordingly, an entirety or a part of the communication unit 310 may be referred to as a "transmitter," a "receiver," or a "transceiver." In addition, in the following descriptions, transmitting and receiving via a wireless channel may be used as a meaning including processing by the communication unit 310 as described above.

The storage 320 may store data such as a basic program for operations of the terminal, an application program, configuration information, or the like. The storage 320 may be configured by a volatile memory, a nonvolatile memory, or a combination of a volatile memory and a nonvolatile memory. In addition, the storage 320 provides stored data according to a request of the controller 330.

The controller 330 controls overall operations of the terminal. For example, the controller 330 may transmit and receive signals via the communication unit 310. In addition, the controller 330 may write and read out data on and from the storage 320. In addition, the controller 330 may perform functions of a protocol stack required by communication standards. To achieve this, the controller 330 may include at least one processor or micro processor, or may be a part of a processor. In addition, a part of the communication unit 310 and the controller 330 may be referred to as a communication processor (CP).

According to various embodiments, the controller 330 may control the terminal to perform operations according to various embodiments which will be described below.

Figure 4:
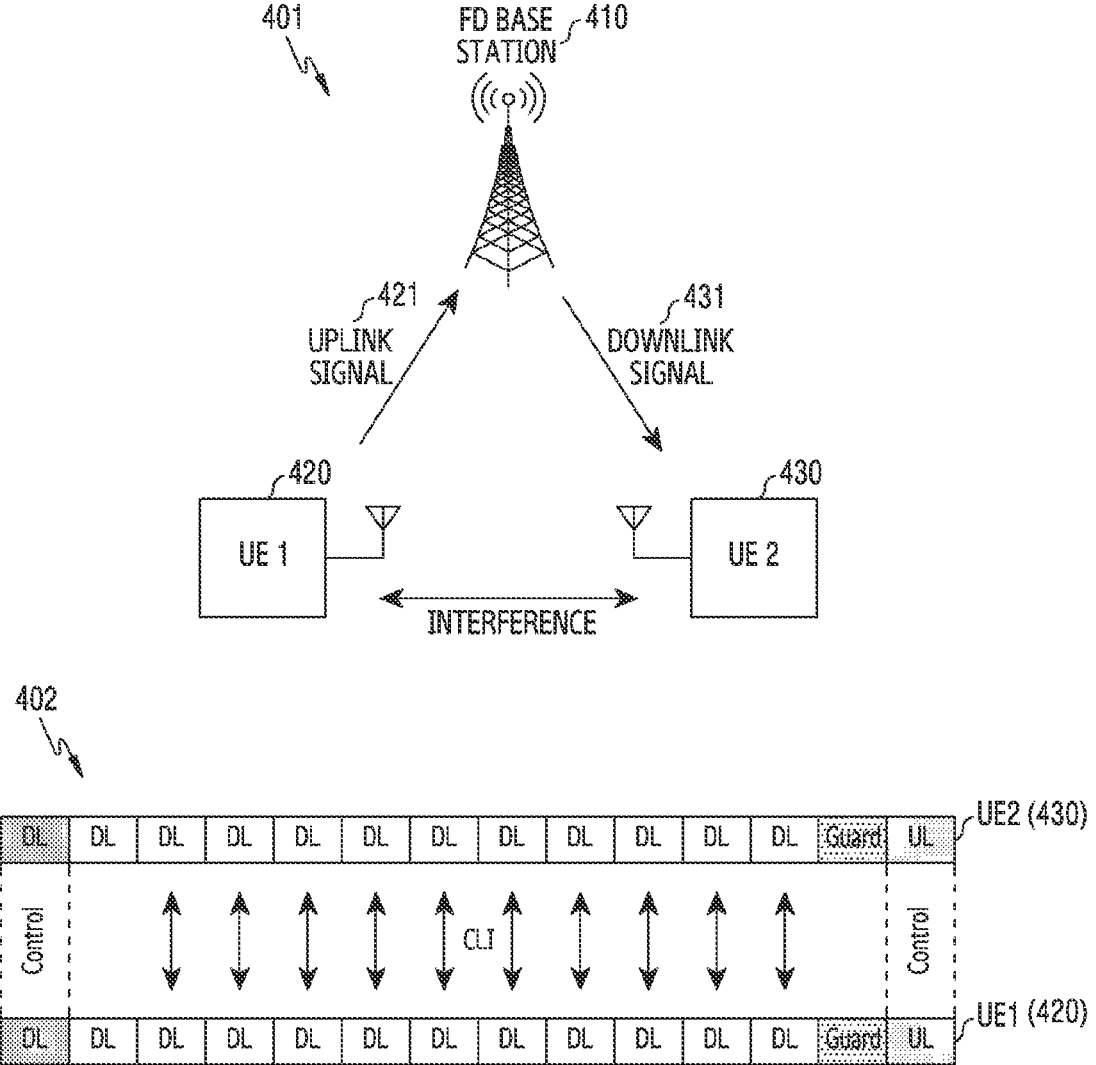
FIG. 4 is a view illustrating an example of an FD base station communication environment in a wireless communication system, and an example of a CLI according to an embodiment of the disclosure.

FIG. 4 illustrates an example of an FD base station communication environment in a wireless communication system, and an example of a CLI according to an embodiment of the disclosure.

With an increase in use of services requiring high-speed data transmission and development of internet of things (IoT), efficient improvement of spectrum resources of a wireless network is being continuously demanded. Accordingly, various researches for developing a bandwidth, a data transfer rate, etc. have been ongoing. In particular, an in-band FD communication system is being on the spotlight as a next-generation technology for efficient use of insufficient frequency resources.

In-band FD communication refers to a wireless communication technology that allows transmission and reception to be performed concurrently in the same frequency band. Theoretically, FD communication may obtain a twofold throughput of a network, compared to half duplex (HD) communication which uses the same frequency band, but performs transmission and reception of signals concurrently in the same frequency band, and to this end, a transmitted signal may interfere with a signal to be received. Specifically, in FD communication, signals are transmitted and received between a base station and a plurality of terminals concurrently, and accordingly, a signal that a certain terminal transmits may interfere with a signal that another terminal receives, and such an interference signal may be defined as a CLI.

According to various embodiments of the disclosure, FD communication which will be described below may include not only in-band FD communication but also sub-band FD communication or cross division duplex (XDD) FD communication.

Sub-band FD communication may provide use of mixed subcarriers and asynchronous transmission to apply FD communication flexibly. A sub-band FD communication system may divide an entire system band into sub-bands and then may transmit uplink data and downlink data concurrently in every sub-band. In this case, all transmission and reception processes including synchronization may be performed based on the divided sub-bands, and different subcarrier application and asynchronous uplink transmission may be performed in every sub-band. Such transmission on a sub-band basis may cause an inter-sub-band interference, and various solutions for preventing interferences according to various embodiments of the disclosure may be applied.

XDD FD communication may include a scheme of dividing uplink and downlink resources in a frequency domain like a frequency division duplex (FDD) system, in addition to dividing a ratio in a time domain according to a traffic ratio of uplink and downlink signals under a time division duplex (TDD) system. XDD FD communication may cause an interference in terms of a scenario in which transmission and reception in a time domain and transmission and reception in a frequency domain coexist, and various solutions for measuring and preventing an interference according to various embodiments of the disclosure may be applied.

Prior to explaining CLI measurement according to various embodiments of the disclosure, an FD communication system will be described in detail hereinafter. An in-band FD communication system (hereinafter, referred to as an FD communication system or an FD system) refers to a system that allows an uplink signal and a downlink signal to be transmitted concurrently within the same band, the same time resource, which is different from a TDD or FDD system. That is, in an FD system, an uplink signal and a downlink signal may coexist within the same cell and may be transmitted and received at the same time, and this may act as an interference on a transmission entity and a reception entity.

As described above, in the FD system, only one of an uplink signal or a downlink signal may be transmitted and received at the same time if necessary, or an uplink signal and a downlink signal may be transmitted and received concurrently. In addition, an interference caused by transmission and reception of signals in the FD system may include not only a signal itself that is transmitted within a band, but also a leakage caused by the signal. In addition, an FD operation may be implemented only in some bands of all system bands, or may be implemented in all bands.

In the following descriptions, concurrent transmission of the FD system will be mainly described by considering a transmitter and receiver belonging to one node (or entity). However, when a transmitter and a receiver belong to different nodes, the concurrent transmission may include an FD operation between the different nodes, which may share information necessary for the FD operation by exchanging information with each other.

According to an embodiment, an interference which may be additionally caused by the above-described FD system may be classified into two types, a self-interference and a CLI.

The self-interference refers to an interference that is received together when one node (for example, a node A) receives a signal of another node (for example, a node B). In this case, the node A and the node B may include various entities such as a base station, a terminal, integrated access and backhaul (IAB), etc. In addition, regarding one node or entity, nodes or entities may be recognized as one node when they are connected with each other wiredly or wirelessly and share information with each other even if they are physically separated. Accordingly, the self-interference may include an interference that occurs between two different nodes which may share information with each other. In addition, the self-interference may include not only a signal that is received in the same band but also a signal that is received in a different band. In addition, the self-interference may include out-of-band radiation occurring due to signals transmitted in different bands. Since the self-interference occurs due to transmission and reception performed at a close distance compared to a desired signal, the self-interface may greatly reduce a signal to interference and noise ratio (SINR) of the desired signal. Accordingly, performance of the FD system may greatly depend on self-interference cancellation performance.

The CLI may include an interference which is caused by a downlink signal that a base station receives from another base station in the same band when the base station receives an uplink signal from a terminal, and an interference which is caused by an uplink signal that a terminal receives from another terminal when the terminal receives a downlink signal. When a CLI is caused by a base station receiving an uplink signal and receiving a downlink signal from another base station (hereinafter, an inter-base station CLI), a distance from an interference transmitter to an interference receiver is relatively long compared to a distance between a terminal receiving a desired signal of the base station and a receiver of the base station, but, since a transmit power of the base station is normally greater than a transmit power of the terminal by 10-20 dB or more, the CLI may greatly influence performance of reception SINR performance of the uplink signal that the base station receives from the terminal. In addition, when a CLI is caused by a terminal receiving a downlink signal and receiving an uplink signal from another terminal in the same band (hereinafter, an inter-terminal CLI), if a distance from an interference transmitter to the terminal is meaningfully closer than a distance from the base station to the terminal which receives the downlink signal, a reception SINR performance of the downlink signal that the terminal receives from the base station may be degraded. The distance from the interference transmitter being meaningfully close implies that a receive power of an interference signal received from the interference transmitter terminal (that is, the terminal transmitting the uplink signal) is greater than or similar to a receive power of the downlink signal that the terminal which is an interference receiver receives from the base station, and the interference signal degrades reception SINR performance of the downlink signal of the terminal.

Types of FD systems in a cellular-based communication system may include a type that supports a self-interference cancellation (SIC) function for supporting an FD operation only by a base station, and a type that supports the SIC function by both a base station and a terminal. It may be necessary to implement antenna separation SIC, radio frequency (RF)-circuit SIC, digital SIC, or the like in order to cancel an SI. Since the base station is more advantageous than the terminal in terms of a form factor and a circuit structure for such implementation, a type that supports the SIC function only by a terminal may not be considered.

In the disclosure, the type that supports the SIC by the base station in the FD system may be considered but the following contents may be equally or similarly applied to a case in which both a terminal and a base station support the SIC function. Accordingly, the term "terminal" or "base station" may refer to not only one terminal or base station or itself, but also another device (or node, entity) having a transceiving function.

Hereinafter, a CLI will be described in detail with reference to the example of the FD base station communication environment and the example of the CLI illustrated in FIG. 4.

Referring to a wireless communication environment 401 of FIG. 4, a base station 410 in an FD base station environment may perform unidirectional FD communication with a first terminal 420 and a second terminal 430. The two terminals 420 and 430 which communicate with the base station 410 for UL transmission and DL reception may perform HD communication with the base station, respectively. In this case, since an uplink signal 421 that the first terminal 420 transmits and a downlink signal 431 that the second terminal 430 receives may be transmitted and received through the same frequency at the same time in the FD base station environment, an interference may occur.

Referring to example 402 of a time-axis interference symbol of FIG. 4, an example of an interference on a time axis caused by an inter-terminal signal interference in the FD base station environment is illustrated. In the FD base station environment, the first terminal 420 and the second terminal 430 which share the same frequency may have uplink or downlink transmission and reception configured on the same resource (for example, slot (or symbol)). In this case, since the uplink signal (UL) that the first terminal 420 transmits and the downlink signal (DL) that the second terminal 430 receives are transmitted and received at the same time, a CLI may occur therebetween.

According to various embodiments of the disclosure, the disclosure provides a method and an apparatus for measuring an interference which may occur in a process of a base station of an FD system transmitting and receiving a data channel (for example, a physical uplink shared channel (PUSCH), a physical downlink shared channel (PDSCH)) to and from at least one terminal. Specifically, a technology whereby a base station allocates a resource for transmitting and receiving a CLI-reference signal (RS) to at least one terminal in order to minimize an overhead efficiently, and receives a report regarding transmission and reception of the CLI-RS between the at least one terminal and a CLI measurement terminal, and measurement, and transmits and receives a data channel will be described.

In various embodiments which will be described below, an interference occurring during transmission and reception of a downlink or uplink signal of each terminal in an FD system is referred to as a CLI. However, the disclosure is not limited thereto, and an interference occurring during transmission and reception of signals of respective terminals in an FD system may be referred to as various terms such as a UE-to-UE interference, an FD interference. In addition, in various embodiments which will be described below, a CLI-RS may be referred to as various terms which are interpreted as a reference signal for measuring a UE-to-UE interference, such as a CLI measurement RS, a cross-link channel state information RS, a UE-to-UE channel information RS, or terms equivalent thereto.

Figure 5:
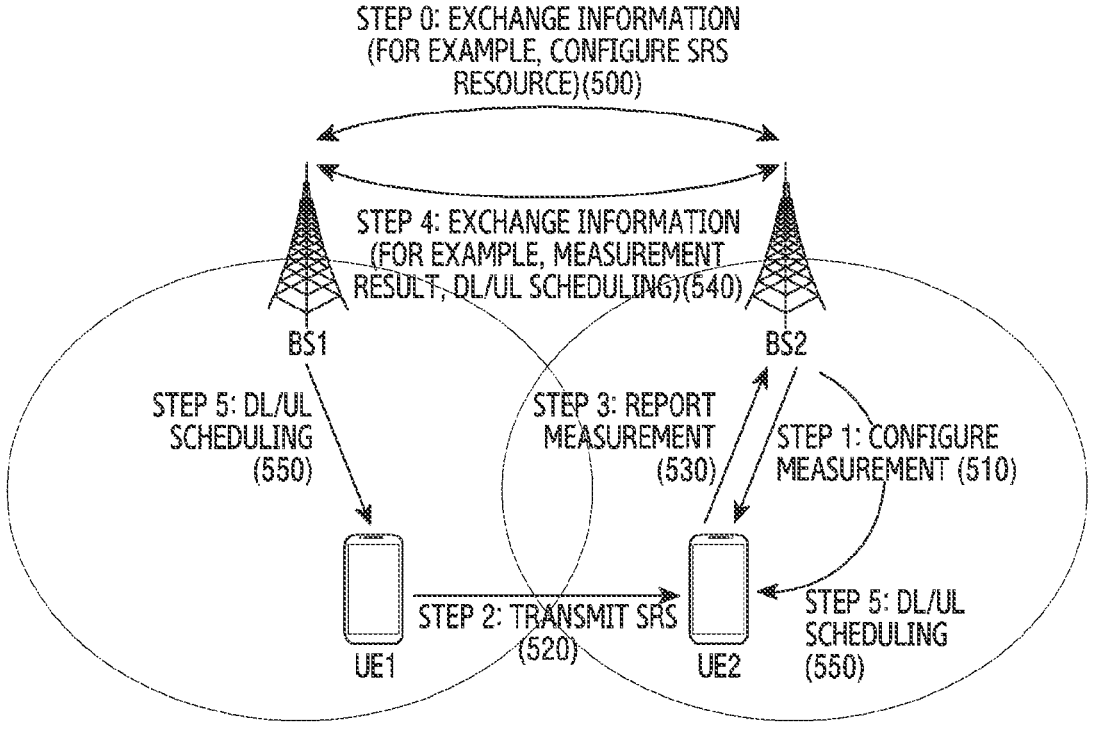
FIG. 5 is a view illustrating a CLI measurement process according to an embodiment of the disclosure.

FIG. 5 illustrates a CLI measurement process according to an embodiment of the disclosure. Herein, various embodiments for measuring a CLI in an FD system are proposed. Prior to explaining specific embodiments, a related-art CLI measurement process will be described with reference to FIG. 5.

The related-art CLI measurement process is for measuring a CLI in a dynamic TDD (D-TDD) system which is able to dynamically adjust a ratio of an uplink frame and a downlink frame, rather than in the above-described in-band FD system. Since technologies of base stations supporting the SIC function, which is a requirement for an FD system in a related-art wireless communication system, such as 5G or wireless fidelity (Wi-Fi), are still premature, the SIC function or CLI measurement process for the FD system has not been specifically discussed.

As described above, in the CLI measurement process for controlling a CLI in the D-TDD system, only a method for UE-UE CLI measurement between different cells has been taken into consideration, and this method may be performed according to a series of procedures shown in FIG. 5.

At step 0 in FIG. 5, base stations which provide respective cells may share information regarding a radio resource or RS resource to be used for CLI measurement in advance in order to perform UE-UE CLI measurement between difference cells, as indicated by reference character 500. The RS resource may include a sounding reference signal (SRS), but is not limited to the SRS.

At step 1 in FIG. 5, BS2 which is a serving base station of UE2 which is a terminal for measuring a CLI may transmit configuration information for CLI measurement to UE2, as indicated by reference character 510. At step 2, UE1 which is a terminal causing a CLI may transmit a CLI-RS or SRS to UE2 which is the terminal for measuring the CLI in order to measure the CLI, as indicated by reference character 520.

At step 3 in FIG. 5, UE2 may perform CLI measurement with respect to the CLI-RS or SRS received from UE1, and may report a measurement report to BS2, as indicated by reference character 530. At step 4 in FIG. 5, BS2 which receives the CLI measurement result may share CLI-related information with BS1 with which BS2 has shared information on the CLI measurement resource, as indicated by reference character 540, and the CLI-related information may include the CLI measurement result reported by UE2, DL/UL scheduling-related information, etc. Herein, at step 5 in FIG. 5, BS1 may schedule DL reception and/or UL transmission for UE1, and BS2 may schedule DL reception and/or UL transmission for UE2, as indicated by reference character 550. A process of scheduling may be performed based on the CLI measurement result reported by UE2, and for example, for terminals that are determined as being subject to great CLI, DL reception and UL transmission may be scheduled on different time resource, frequency resource, and space resources.

Hereinafter, a specific method for efficient DLI measurement between a plurality of terminals positioned within the same cell which is managed by one base station, which is different from the above-described method, will be described according to various embodiments of the disclosure.

FIGS. 6A, 6B, and 6C illustrate situations where a CLI is measured according to various embodiments of the disclosure. Specifically, FIGS. 6A to 6C illustrate a situation where a CLI occurs or a situation where muting of an unnecessary resource occurs when a plurality of terminals are on specific positions. As described above, a process of measuring a UE-UE CLI in different cells has been mainly discussed as a related-art technology. Such a method may not be enough to be applied to a process of measuring a CLI between base stations in different cells or a process of measuring a CLI between terminals within the same cell.

More specifically, when RS resources for CLI measurement are used in an FD system, an overhead caused by CLI measurement may linearly increase as the number of terminals for CLI measurement within a cell increases. Accordingly, the disclosure provides specific embodiments for an intra-cell UE-UE CLI measurement process. In particular, the disclosure proposes a method of grouping and configuring CLI-RS resources to be allocated to a plurality of CLI measurement target terminals in an embodiment for UE-UE CLI measurement (or intra-cell UE-UE CLI measurement). Accordingly, the number of times that a CLI is measured in a cell where a plurality of terminal exist may be reduced, and accordingly, degradation of CLI measurement efficiency caused by an overhead resulting from CLI measurement may be prevented.

Referring to FIGS. 6A to 6C, a situation where an intra-cell UE-UE CLI is measured will be described in detail. There is a need for a solution for reducing the number of times that a CLI is measured for efficient CLI measurement. According to an embodiment, a method for specifying terminals which may cause a CLI and reducing an overhead by excluding unnecessary operations regarding terminals may be considered as a solution for reducing the number of times that a CLI is measured. FIGS. 6A to 6C illustrate situations of terminals which cause a CLI in an FD system before a base station specifies terminals for CLI measurement.

FIG. 6A illustrates a situation in which a terminal (hereinafter, DL UE) that accesses a base station (or an FD base station) operating in an FD system and receives a downlink signal, and a terminal (hereinafter, UL UE) that transmits an uplink signal are away from each other by a great distance. FIG. 6B illustrates a situation where a terminal (DL UE) that accesses an FD base station operating in an FD system and receives a downlink signal, and a terminal (UL UE) which transmit an uplink signal are close to each other and are away from the base station by a great distance.

In all of the cases of FIGS. 6A and 6B, the uplink signal that DL UE receives from UL UE is received $(D1+D2-D3)/c$ before the downlink signal that DL UE receives from the base station. In this case, D1 is a distance from the base station to DL UE, D2 is a distance from the base station to UL UE, and D3 is a distance between DL UE and UL UE.

The situation of FIG. 6A will be described in detail. Since DL UE is located at a close distance to the base station and is located at a great distance from UL UE, D2 and D3 have relatively similar values compared to D1. In this case, a CLI signal of UL UE that is received by DL UE may be received at a similar time to when a downlink signal is received from the base station, and DL UE may receive the CLI signal of UL UE within a detection window for detecting the downlink signal from the base station.

The situation of FIG. 6B will be described in detail. Since DL UE and UL UE are all situated away from the base station and DL UE and UL UE are located at a close distance to each other, D3 is relatively close to 0 and D1 and D2 have similar values. In this case, when a distance between DL UE and the base station is greater than or equal to a threshold value (that is, D1 is greater than or equal to the threshold value), a signal that DL UE receives from UL UE may be received after a CP time section from a detection window for detecting the downlink signal from the base station. In this case, DL UE is not able to receive a CLI signal of UL UE within the detection window for detecting a signal from the base station. The threshold distance may correspond to a half of a distance that is proportional to a time domain length of a CP based on a subcarrier spacing (SCS) as shown in FIG. 6C. For example, in the case of a base station of frequency range 1 (FR1) having an SCS of 30 kHz, when D1 is greater than or equal to 345 mm (that is, a half of 690 meters (m) which is proportional to CP 2.3 micro seconds (μsec)), a problem that CLI detection is impossible may arise, and in the case of a base station of FR2 having an SCS of 120 kHz, when D1 is greater than or equal to 89 m (that is, a half of 177 m which is proportional to CP 0.59 (μsec), the above-described problem may arise.

As described above, when DL UE and UL UE are far away from the base station (for example, in the proximity of a coverage boundary) and DL UE and UL UE are located at a relatively close distance, a problem that CLI detection is impossible may arise, and accordingly, the base station may consider a detection-disabled section and may mute a transmission resource during this section. As a result, the base station and the plurality of terminals are located at a specific distance from each other, such that CLR-RS resources are unnecessarily wasted, and, as the number of terminals in a cell increases, the number of times that a CLI-RS is measured, which is linearly proportional to the number of cells, increases, and eventually, an unnecessary CLI measurement overhead may occur. Hereinafter, various methods for reducing an overhead which may occur when a CLI is measured according to various embodiments will be described.

Figure 7:
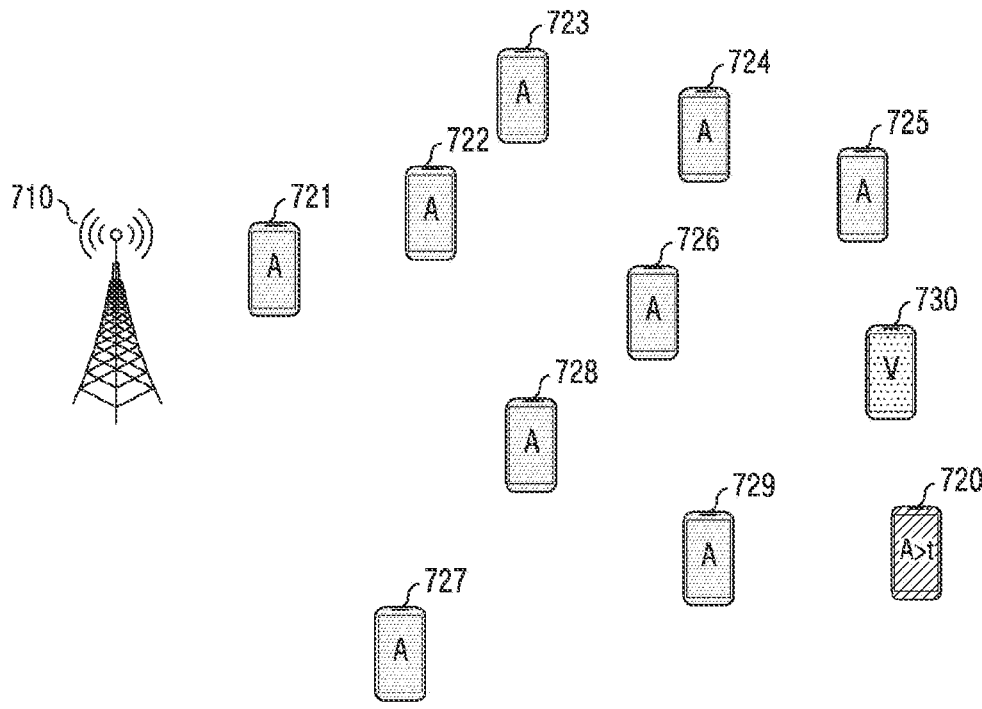
FIG. 7 is a view illustrating a wireless environment network in which a CLI occurs according to an embodiment of the disclosure.

FIG. 7 illustrates a wireless environment network in which a CLI occurs according to an embodiment of the disclosure. According to various embodiments, operations of efficiently measuring an intra-cell CLI without causing unnecessary overhead are disclosed.

Referring to FIG. 7, when a base station performs an FD operation within the same cell, the base station should know how much CLI occurs with respect to all pairs of terminals existing within the cell in order to determine and configure a UL terminal and a DL terminal to be allocated to the same resource. More specifically, a wireless network system may include a base station 710 provided with an FD function and a plurality of terminals (e.g., terminals 720, 721, 722, 723, 724, 725, 726, 727, 728, 729, and 730), and, when the plurality of terminals 720 to 730 exist within the same cell which is managed by the base station 710, the base station should know about influence on each UE-UE CLI link in order to determine a combination of terminals that perform uplink or downlink scheduling concurrently.

In this case, knowing about influence on each UE-UE CLI link may imply that, in determining a terminal to be co-scheduled with terminal 730, the base station should know about influence of the CLI between at least one candidate terminal (e.g., at least one of candidate terminals 721, 722, 723, 724, 725, 726, 727, 728, and 729) to be co-scheduled, and the terminal 730.

According to an embodiment, the terminal 730 which receives a downlink signal through a specific resource may have a CLI occurring due to an uplink signal (for example, an SRS, etc.) that is transmitted by at least one candidate terminal 721 to 729 through the same specific resource. In this case, the terminal 730 which measures a CLI may be referred to as a victim terminal, and at least one terminal which transmits and receives a signal causing the victim terminal a CLI may be referred to as an attacker terminal.

In this case, in order to co-schedule between the victim terminal 730 and the at least one attacker terminal through the same resource in the FD system, the base station should obtain a CLI between the terminal 730 and the at least one attacker terminal The victim terminal 730 should measure a CLI occurring from the at least one attacker terminal, respectively, and may receive and measure respective CLI-RSs of the attacker terminals.

However, in this case, when the number of attacker terminals causing the victim terminal 730 a CLI is N, the victim terminal should receive as many CLI-RSs as $_NC_2$ arithmetically in order to exactly measure the CLI. As the number of attacker terminals increases, overhead for CLI measurement may unnecessarily increase. For example, when the number of attacker terminals causing the victim terminal 730 a CLI is 10, the victim terminal 730 may receive CLI-RSs from the respective attacker terminals, and may perform CLI-RS receiving and measuring operations as many times as $_{10}C_2=45$. As a result, as the number of terminals within the cell of the base station increases, the victim terminal 730 should receive more CLI-RSs, and unnecessary overhead resulting therefrom may linearly increase.

Accordingly, various embodiments of the disclosure propose a method for efficiently measuring a UE-UE CLI in the same cell. For example, according to an embodiment, there is provided a method for determining a target terminal for measuring a CLI based on quality of a signal, and there is provided a method for transmitting and receiving and measuring a CLI-RS efficiently based on grouping of CLI-RS resources. For example, the base station 710 may determine a victim terminal 730 for measuring a CLI, and may determine an attacker terminal 721 to 729 which transmits an uplink signal causing the victim terminal 730 a CLI. The CLI measurement terminal 730 and the attacker terminals 721 to 729 may receive a configuration of a resource for transmitting and receiving a CLI-RS from the base station 710, respectively, and the CLI measurement terminal 730 may determine at least one attacker terminal 720 that causes a CLI greater than or equal to a threshold value as a CLI causing terminal, based on the CLI-RSs received from the attacker terminals 721 to 729. The victim terminal 730 may transmit, to the base station 710, a CLI-RS measurement result including information on the attacker terminal 720 causing the CLI greater than or equal to the threshold value, and, based on this, the base station 710 may determine not to co-schedule between the victim terminal 730 and the attacker terminal 720 which causes the victim terminal 730 a CLI.

According to various embodiments of the disclosure, the disclosure describes a method for configuring and measuring a CLI between a base station and a terminal or between terminals by an omni beam. However, this is merely an example. For example, various embodiments may be applied to configuring and measuring a CLI between a base station and a terminal or between terminals by a multi-beam in an FR2 band, and the base station may configure a CLI-RS more specifically, considering CLI-RS resources for beam-forming of terminals which are able to form a plurality of beams.

Figure 8:
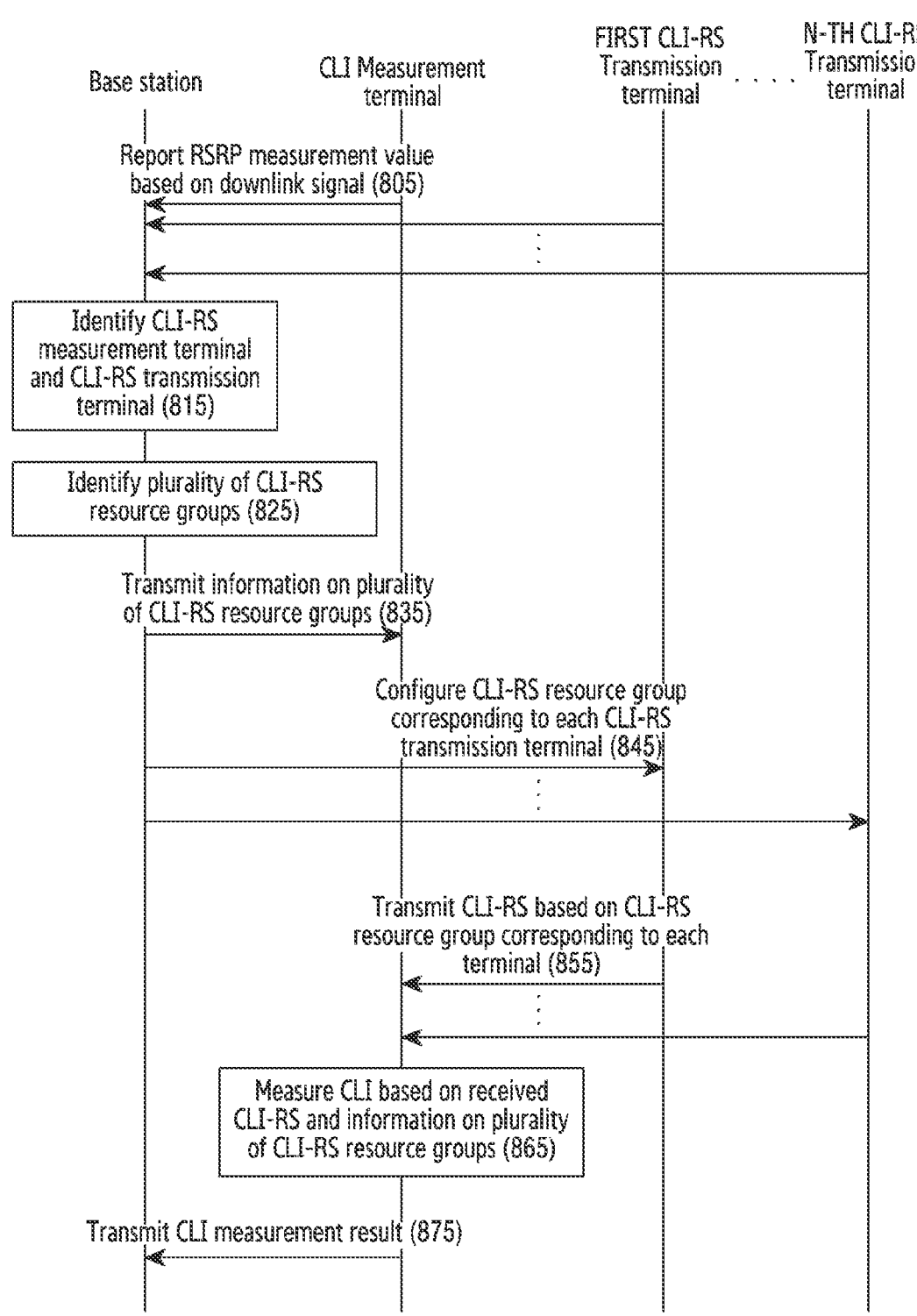
FIG. 8 is a view illustrating a flow of a signal for configuring and measuring a CLI-RS between a base station and terminals according to an embodiment of the disclosure.

FIG. 8 illustrates a flow of a signal for configuring and measuring a CLI-RS between a base station and a terminal according to an embodiment of the disclosure.

At operation 805, a plurality of terminals including a CLI measurement terminal and a plurality of CLI-RS transmission terminals may report an RSRP measurement value of a downlink signal to the base station. According to an embodiment, the base station may receive, from terminals within the same cell, a report on a reception size of the downlink signal that the base station transmits. Herein, a report result transmitted by the terminal may include information on various signal quality values on the downlink signal that the terminal receives from the base station.

At operation 815, the base station may identify the CLI measurement terminal and a CLI-RS transmission terminal (for example, a CLI non-measurement terminal). According to an embodiment, not all the terminals within the same cell cause a CLI to the extent of influencing co-scheduling, and the base station may determine a CLI measurement or non-measurement terminal, based on a report result received from respective terminals in order to reduce unnecessary resource waste or overhead. According to an embodiment, when a reported signal quality value of the downlink reception signal is less than or equal to a specific threshold value, the base station may designate the corresponding terminal to measure the CLI. On the other hand, when the reported signal quality value of the downlink reception signal exceeds the specific threshold value, the base station may designate the corresponding terminal not to measure the CLI.

Operations 805 and 815 will be described in detail with reference to examples of FIGS. 9A and 9B.

At operation 825, the base station may identify a plurality of CLI-RS resource groups (hereinafter, CLI-RS groups). According to an embodiment, the base station may determine at least one CLI-RS resource group corresponding to each CLI-RS transmission terminal. According to an embodiment, the at least one CLI-RS resource group may include one or more CLI-RS resources. In this case, the one or more CLI-RS resources may be independently divided by a time, a frequency, a code area, a sequence, etc., and refer to resources which are individually allocated. According to an embodiment, in one operation of the operations of determining the at least one CLI-RS resource group, one or more CLI-RS resources allocated to one terminal may be allocated to a plurality of terminals concurrently. However, the base station may allocate such that at least one CLI-RS group allocated to each terminal does not include the same CLI-RS resource or is not allocated as a subset, compared to a CLI-RS group allocated to another terminal. According to an embodiment, the CLI-RS resource group may be determined or identified based on a matrix. For example, when a CLI-RS group based on an M×N matrix is determined, overhead caused by CLI measurement may be reduced from M×N to 2M.

At operation 835, the base station may transmit information on the plurality of CLI-RS groups to the CLI measurement terminal. According to an embodiment, the base station may notify the CLI measurement terminal of a universal set of CLI-RS groups allocated to the CLI-RS transmission terminals. Herein, the universal set of the CLI-RS groups may include not only a universal set of individual CLI-RS resources allocated to the respective CLI-RS transmission terminals, but also mapping information of the CLI-RS groups allocated to the respective terminals. The universal set of the CLI-RS groups may be transmitted as independent information or configuration information.

At operation 845, the base station may configure corresponding CLI-RS groups for the plurality of CLI-RS transmission terminals. According to an embodiment, the base station may configure CLI-RS groups which are determined to be allocated to the CLI-RS transmission terminals, respectively. The base station may individually configure CLI-RS groups 1 to N for CLI-RS transmission terminals 1 to N, and accordingly, may allocate one or more CLI-RS resources to the respective terminals redundantly, such that CLI-RS transmission and reception are configured only by using fewer CLI-RS resources than the number of CLI-RS transmission terminals.

Operations 825 to 845 will be described in detail through examples of FIGS. 10A and 10C.

At operation 855, the plurality of CLI-RS transmission terminals may transmit a CLI-RS to the CLI measurement terminal. According to an embodiment, the CLI-RS transmission terminal may transmit the CLI-RS to the CLI measurement terminal based on the CLI-RS group allocated thereto.

At operation 865, the CLI measurement terminal may measure a CLI based on the CLI-RS and information on the plurality of CLI-RS groups. According to an embodiment, the CLI measurement terminal may measure CLI-RSs received from the CLI-RS transmission terminals. More specifically, the CLI measurement terminal may measure the CLI-RSs received from the respective terminals, based on the universal set of CLI-RS groups obtained from the base station.

Operations 855 and 865 will be described in detail through examples of FIG. 11.

At operation 875, the CLI measurement terminal may transmit a CLI measurement result to the base station. According to an embodiment, the CLI measurement terminal may report information on a CLI-RS that is identified as being higher than a pre-defined CLI-RS measurement size (for example, a CLI threshold value) from the measurement result on the universal set of CLI-RS resources to the base station. According to another embodiment, the CLI measurement terminal may identify a terminal that causes CLI by a specific value or more, first, based on at least one CLI-RS resource identified as exceeding the CLI threshold value, and information on the universal set of the CLI-RS groups obtained from the base station, and may report the identified terminal to the base station.

Operations of operation 875 will be described in detail through examples of FIG. 12.

According to various embodiments of the disclosure, the steps illustrated in FIG. 8 are merely examples and are not limited thereto, and, in order to achieve effects of CLI configuration and measurement at which the disclosure aims, various embodiments may include all, a part of the operations 805 to 875, or at least one of combinations of some of the operations 805 to 875.

Figure 9A:
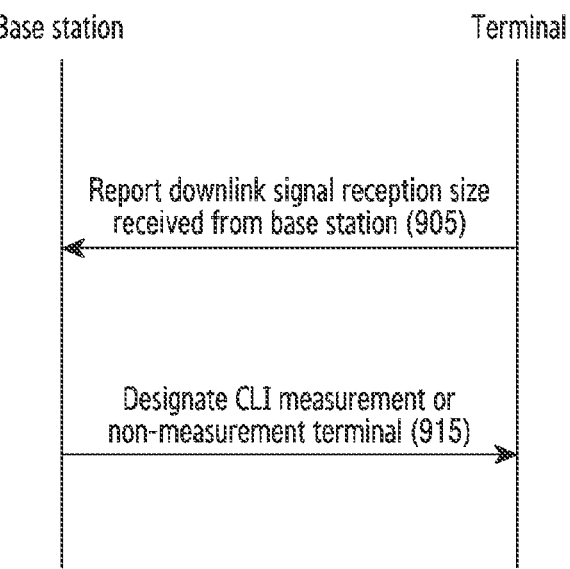
FIG. 9A is a view illustrating a flow of a signal for determining a CLI measurement terminal according to an embodiment of the disclosure.

FIG. 9A illustrates a flow of a signal for determining a CLI measurement terminal according to an embodiment of the disclosure. Specifically, when there are a plurality of terminals in one cell, measuring CLIs of all of the terminals may result in unnecessary resource waste and overhead. Accordingly, the base station may preferentially determine a terminal in which a CLI occurring in co-scheduling with terminals is greater than or equal to a specific threshold value, or which generates an unnecessary muting symbol in DL and UL transmission and reception.

According to an embodiment, the base station may obtain information on signal quality of terminals, and may determine a terminal for measuring CLI. Herein, the signal quality of the terminals may refer to various signal quality values including at least one of a reference signal received power (RSRP), a received signal strength indicator (RSSI), or a reference signal received quality (RSRQ).

According to an embodiment, when a CLI occurs in a terminal that receives a downlink signal, influence by the CLI may be calculated through a function that is based on a size of a CLI from an uplink terminal co-scheduled with the terminal receiving the downlink signal, and a size of the downlink signal received from the base station. For example, a strength of a downlink signal that a certain terminal A receives from a base station is defined as $P_{(DL,A)}$. When $P_{(DL,A)}$ is great enough, performance degradation influence by a CLI may not be great even if the terminal A is co-scheduled with a certain uplink terminal B. Accordingly, the base station may determine the corresponding downlink terminal as a terminal for CLI measurement (for example, a victim terminal), by considering influence of a CLI by the strength of the downlink signal of the downlink terminal and other terminals.

According to an embodiment, the base station may co-schedule a certain terminal with respect to the terminal A in order to obtain a resource gain that may be obtained by allocating the uplink terminal B and the downlink terminal A, concurrently, from a point of view of a system. In this case, co-scheduling implies that the base station receives an uplink signal from the uplink terminal B while transmitting a downlink signal to the downlink terminal A with respect to the same time/frequency resource.

At operation 905, considering the above, the base station may receive a report on a reception size of the downlink signal that the base station transmits from a terminal in the same cell. Herein, the report result transmitted by the terminal may include information on various signal quality values of the downlink signal that the terminal receives from the base station.

At operation 915, the base station may determine a CLI measurement terminal and a CLI non-measurement terminal. As described above, not all the terminals within the same cell cause a CLI to the extent of influencing co-scheduling, and the base station may determine a CLI measurement or non-measurement terminal, based on the report result received from respective terminals in order to reduce unnecessary resource waste or overhead.

According to an embodiment, when a reported signal quality value of the downlink reception signal is less than or equal to a specific threshold value, the base station may designate the corresponding terminal to measure CLI. That is, the base station may determine whether to designate the corresponding terminal as a CLI measurement terminal, based on reception size information on the downlink signal which is received from the terminal, and may transmit a result therefrom to the determined measurement terminal. However, this is merely an example. The base station may determine whether to designate the corresponding terminal as a measurement terminal, and then, may omit the operation of transmitting the result of designating to the terminal, and may directly transmit CLI-RS configuration information according to the result of designating. When the terminal is designated by the base station as a CLI measurement terminal, the terminal may perform CLI measurement according to a specific CLI measurement method, which will be described below, and a part or all of the terminals designated as CLI non-measurement terminals may perform CLI-RS transmission.

According to an embodiment, when the reported signal quality value of the downlink reception signal exceeds the specific threshold value, the base station may designate the corresponding terminal not to measure CLI. That is, the base station may determine whether to designate the corresponding terminal as a CLI non-measurement terminal, based on reception size information on the downlink signal which is received from the terminal, and may transmit a result therefrom to the determined non-measurement terminal. However, this is merely an example. The base station may determine whether to designate the corresponding terminal as a non-measurement terminal, and then, may omit the operation of transmitting the result of designating to the terminal, and may directly transmit CLI-RS configuration information according to the result of designating. When the terminal is designated by the base station as a CLI non-measurement terminal, the base station may configure all or a part of the designated non-measurement terminals to transmit a CLI-RS according to a specific CLI measurement method, which will be described below. A part or all of the terminals designated as CLI non-measurement terminals may not perform CLI measurement and may perform CLI-RS transmission.

Figure 9B:
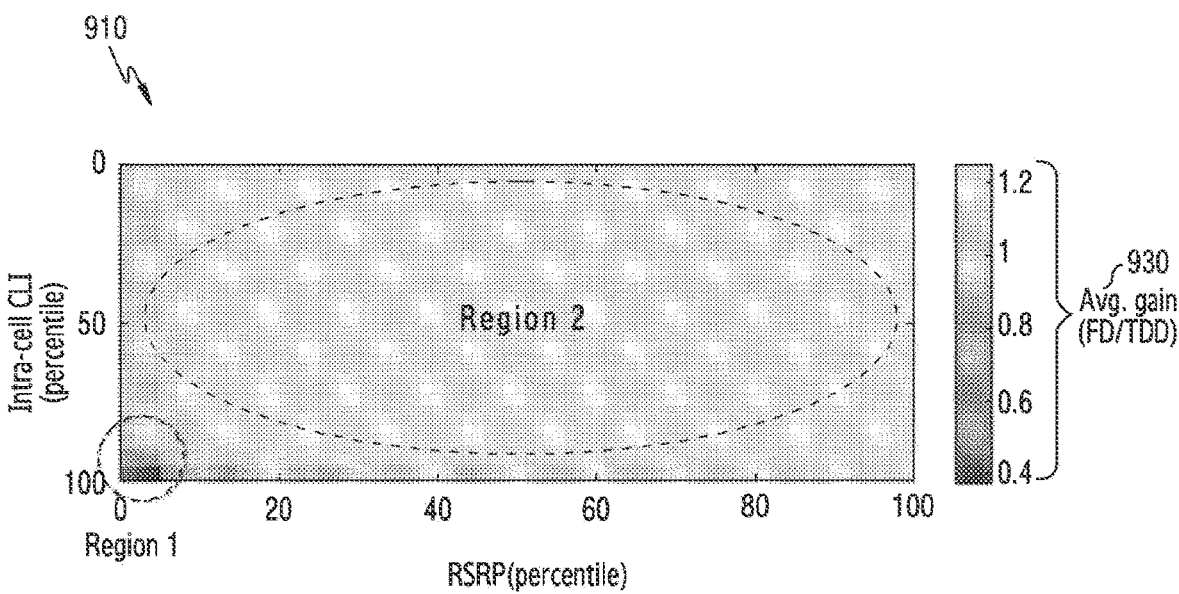
FIG. 9B is a view illustrating a graph of an FD gain which is obtained according to a reference signal received power (RSRP) and a CLI according to an embodiment of the disclosure.
Figure 9B:
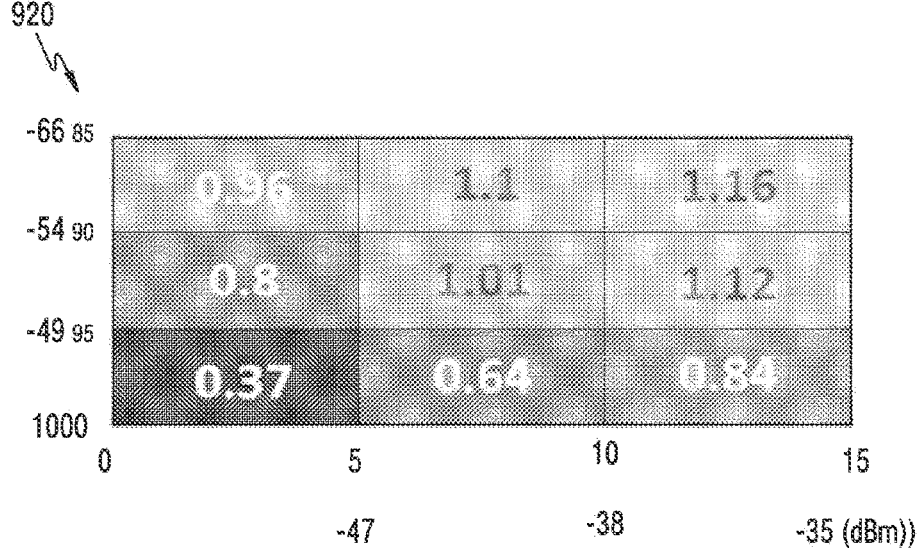

A specific example of the base station determining a CLI measurement terminal and a CLI non-measurement terminal based on signal quality of a downlink signal is illustrated in FIG. 9B.

FIG. 9B illustrates a graph of an FD gain which is obtained according to a RSRP and a CLI according to an embodiment of the disclosure. Referring to FIG. 9B, a first graph 910 illustrates a gain of an HD compared to a TDD according to an RSRP of a terminal downlink signal and intra-cell CLI when a ratio of DL and UL in an FR1 band is 4:1. In addition, a second graph 920 is a graph regarding region 1 of the first graph 910, and illustrates an FD gain when a terminal having a low RSRP value has a high intra-cell CLI. However, according to various embodiments of the disclosure, FIG. 9B is merely an example and this should not be considered as limiting. A value of signal quality that the base station considers to determine a CLI measurement terminal may include an RSRP value, which will be described below, and as a result, may be applied to various signal quality values (for example, an RSSI, an RSRQ, etc.) which may indicate that a strength (or size) of a downlink signal is relatively reduced since a terminal is located on a base station coverage boundary.

Referring to the first graph 910, the horizontal axis indicates a ratio of an RSRP value of signal quality, and the vertical axis indicates a ratio of an intra-cell CLI. In addition, light and shade in the first graph 910 are illustrated differently according to an average ratio 930 of an FD gain to the TDD. For example, region 2 which is a light region in the first graph 910 indicates a case in which the FD gain to the TDD is greater than or equal to 1, and a terminal may perform efficient FD communication under the condition of region 2. However, referring to region 1 and the second graph 920 indicating region 1, the ratio 930 of the FD gain to the TDD may be lower than 1 under a specific condition. Under the corresponding condition, a terminal may perform FD communication and may suffer from a loss compared to TDD or HD communication. For example, when an RSRP ratio of a downlink signal that a specific terminal receives is less than or equal to 5% (for example, higher than or equal to −47 decibel milliwatts (dBm)) and a CLI measurement value between a neighboring uplink terminal and the terminal is greater than or equal to −66 dBm, TDD communication may be more advantageous to performance of the specific terminal than FD communication.

As described above, a base station may need to determine a terminal for measuring a CLI, based on a quality value of downlink signal reception of a terminal in order to co-schedule a plurality of terminals in an FD system. For example, referring to FIG. 9B, it may be normally considered that a downlink reception terminal that has an RSRP value of 40% or more has more advantages in performing FD communication, and accordingly, measuring only CLI values of terminals having an RSRP value less than or equal to a specific threshold value (for example, normally, 10% or less) may be more advantageous to efficiency and overhead. That is, prior to configuring a CLI-RS, the base station may exclude a terminal that does not influence in smoothly performing FD communication, and may determine only a specific terminal as a CLI measurement terminal, so that unnecessary waste of CLI-RS resources may be prevented.

According to an embodiment, the base station may transmit a downlink signal to a plurality of terminals, and may receive a report on information on a signal quality value of the corresponding downlink signal from the respective terminals. The base station may identify a CLI (or CLI-RS) measurement terminal among the plurality of terminals, based on the information on the signal quality value received from the respective terminals. Specifically, the base station may compare the signal quality values of the respective terminals with a specific threshold value, and may determine a terminal that has a downlink signal quality value less than or equal to the threshold value as a CLI measurement terminal.

According to an embodiment, the base station may determine terminals that have downlink signal quality values exceeding the specific threshold value as CLI non-measurement terminals or CLI-RS transmission terminals. Herein, all of the CLI non-measurement terminals may be determined as CLI-RS transmission terminals, and may be configured to transmit CLI-RSs. However, this should not be considered as limiting, and only a part of the CLI non-measurement terminals may be configured to transmit CLI-RSs. For example, the base station may already have known about information on terminals situated at close distances to the CLI measurement terminal, and may determine only terminals that are situated at a predetermined distance or less from the CLI measurement terminal among the CLI non-measurement terminals as CLI-RS transmission terminals. However, this is merely an example, and the base station may compare downlink signal quality values of the CLI non-measurement terminals with another threshold value, and may determine as CLI-RS measurement terminals, and may exclude a terminal that is not able to transmit a CLI-RS among the CLI non-measurement terminals, based on terminal capability information received from the respective terminals, and may determine the other terminals as CLI-RS transmission terminals. That is, a terminal for CLI-RS transmission is only implemented for efficiency of resource or signal transmission and reception between the base station and the CLI measurement terminal, and is not limited to the above-described example.

As described above, the base station may determine the CLI measurement terminal or the CLI-RS transmission terminal (or CLI non-measurement terminal). Hereinafter, a specific method for a base station to constitute configuration information for CLI-RS transmission or reception for each terminal in order to measure a CLI will be described with reference to FIGS. 10A to 10C.

Figure 10A:
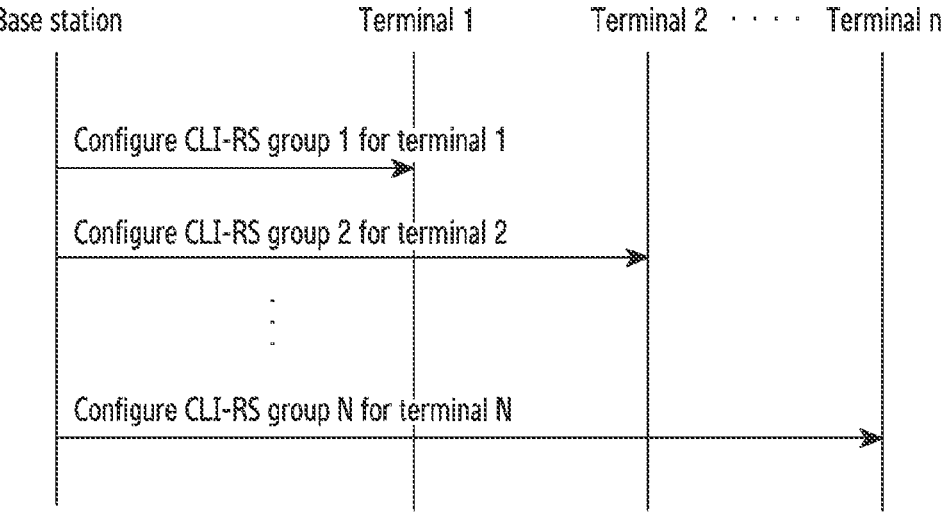
FIG. 10A is a view illustrating a flow of a signal for configuring a CLI-RS group between a base station and CLI-RS transmission terminals according to an embodiment of the disclosure.

FIG. 10A illustrates a flow of a signal for configurating a CLI-RS group between a base station and CLI-RS transmission terminals according to an embodiment of the disclosure. More specifically, after determining a CLI measurement terminal or a CLI-RS transmission terminal (for example, a CLI non-measurement terminal), the base station may configure a resource for a CLI-RS for each terminal. Hereinafter, a specific method for configuring a resource for CLI-RS transmission and reception for each terminal will be described with reference to FIGS. 10A to 10C.

According to an embodiment, the following methods may be considered in measuring a UE-UE CLI. In a first method, the base station may allocate CLI-RSs to all CLI-RS transmission terminals, respectively, and the CLI-RS transmission terminals may transmit CLIs based on CLI-RS resources allocated thereto. In this case, a CLI measurement terminal which receives the CLIs may receive N CLI-RSs corresponding to N CLI-RS transmission terminals, respectively. That is, the CLI measurement terminal may measure N CLIs, and accordingly, may calculate an exact CLI size regarding each CLI-RS transmission terminal. However, in this case, the number of times that the CLI-RSs are transmitted and received may increase in proportion to the number of CLI-RS measurement terminals, and accordingly, an overhead for measuring a CLI may linearly increase as much as the number of terminals.

In a second method, the base station may group the plurality of CLI-RS transmission terminals, and may allocate the same CLI-RS resource to the CLI-RS transmission terminals belonging to the same group. In this case, the base station may determine a group based on terminals that are situated at similar distances from the CLI measurement terminal, or may determine a group by considering characteristics and performance of the plurality of terminals. In this case, the CLI measurement terminal measures CLIs corresponding to the number of groups, rather than CLIs corresponding to the number of all of the CLI-RS transmission terminals, so that the number of times of measuring and an overhead resulting therefrom may be reduced. However, since different CLI-RS transmission terminals are included in one group and a CLI is measured on the basis of a group, accuracy of CLI measurement regarding individual terminals may be degraded.

According to various embodiments of the disclosure, a method for CLI-RS configuration and measurement which exactly measures CLIs for respective CLI-RS transmission terminals, and minimizes an overhead resulting therefrom will be described.

Referring to FIG. 10A, the base station may allocate CLI-RS resource groups to the CLI-RS transmission terminals, respectively. Prior to transmitting configuration information on the CLI-RS resource groups to the terminals, the base station may determine at least one CLI-RS resource group corresponding to each terminal. According to an embodiment, the at least one CLI-RS resource group may include one or more CLI-RS resources. In this case, the one or more CLI-RS resources may be independently divided by a time, a frequency, a code area, a sequence, etc., and refer to resources which are individually allocated. That is, from the hardware aspect, a transceiver of the base station or the terminal may transmit an individual CLI-RS through one or more CLI-RS resources thereof. In this case, at least one CLI-RS group may refer to a group that includes all of the one or more CLI-RS resources allocated to each terminal.

According to an embodiment, in one operation of the operations of determining at least one CLI-RS resource group, one or more CLI-RS resources allocated to one terminal may be allocated to a plurality of terminals concurrently. However, the base station may allocate such that at least one CLI-RS group allocated to each terminal does not include the same CLI-RS resource or is not allocated as a subset, compared to a CLI-RS group allocated to another terminal. For example, when the base station determines to allocate CLI-RS A, CLI-RS B, CLI-RS C to a terminal 1, a group of CLI-RSs transmitted to the terminal 1 may be {A, B, C}, and, when the base station determines to allocate CLI-RS C, CLI-RS D, CLI-RS E to a terminal 2, a group of CLI-RSs transmitted to the terminal 2 may be {C, D, E}. In this case, according to the above-described constraint condition, the base station may allocate such that a CLI-RS group which is the same as the group of CLI-RSs allocated to the terminal 1, {A, B, C}, or corresponds to a subset, for example, {A, B, C}, {A}, {B}, {C}, {A, B}, {B, C}, {A, C}, { }, etc., is not allocated to another terminal.

According to an embodiment, the base station may configure CLI-RS groups which are determined to be allocated to the CLI-RS transmission terminals. The base station may individually configure CLI-RS groups 1 to N corresponding to the CLI-RS transmission terminals 1 to N, and accordingly, may allocate one or more CLI-RS resources to the respective terminals redundantly, such that CLI-RS transmission and reception may be configured only by using fewer CLI-RS resources than the number of CLI-RS transmission terminals. As a result, the CLI measurement terminal may measure a CLI value of an individual terminal through information on the CLI-RS groups and a combination of CLI-RSs received from the respective terminals, so that an exact CLI size may be measured.

Figure 10B:
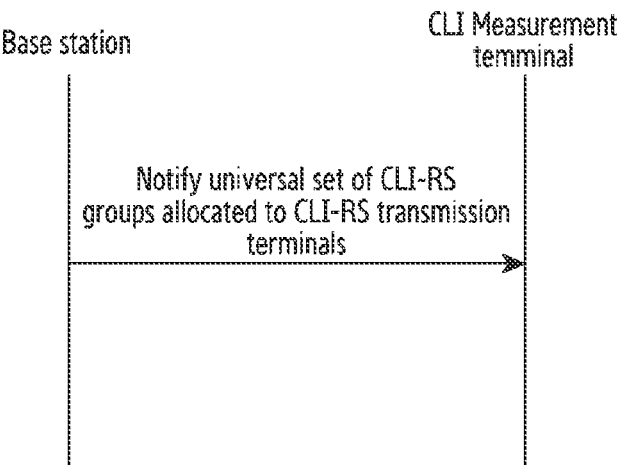
FIG. 10B is a view illustrating a flow of a signal for notifying information on a CLI-RS group between a base station and a CLI measurement terminal according to an embodiment of the disclosure.

FIG. 10B illustrates a flow of a signal for notifying information on CLI-RS groups between a base station and a CLI measurement terminal according to an embodiment of the disclosure.

Referring to FIG. 10B, the base station may transmit information on the CLI-RS groups allocated to the CLI-RS transmission terminals to the CLI measurement terminal.

According to an embodiment, the base station may notify the CLI measurement terminal of a universal set of the CLI-RS groups allocated to the CLI-RS transmission terminals. Herein, the universal set of the CLI-RS groups may include not only a universal set of individual CLI-RS resources allocated to the CLI-RS transmission terminals, but also mapping information of the CLI-RS groups allocated to the respective terminals. The universal set of the CLI-RS groups may be transmitted as independent information or configuration information. For example, when the base station allocates a CLI-RS group {A, B, C} which is a set of CLI-RS A, CLI-RS B, CLI-RS C to the terminal 1, and allocates a CLI-RS group {C, D, E} which is a set of CLI-RS C, CLI-RS D, CLI-RS E to the terminal 2, the base station may inform the CLI measurement terminal of a CLI-RS resource group {A, B, C, D, E} which corresponds to the universal set of the groups allocated to the terminals 1 and 2.

According to an embodiment, the CLI measurement terminal may individually identify a terminal that has a CLI greater than or equal to a specific threshold value, based on the universal set of the CLI-RS groups obtained and resources of received CLIs.

Figure 10C:
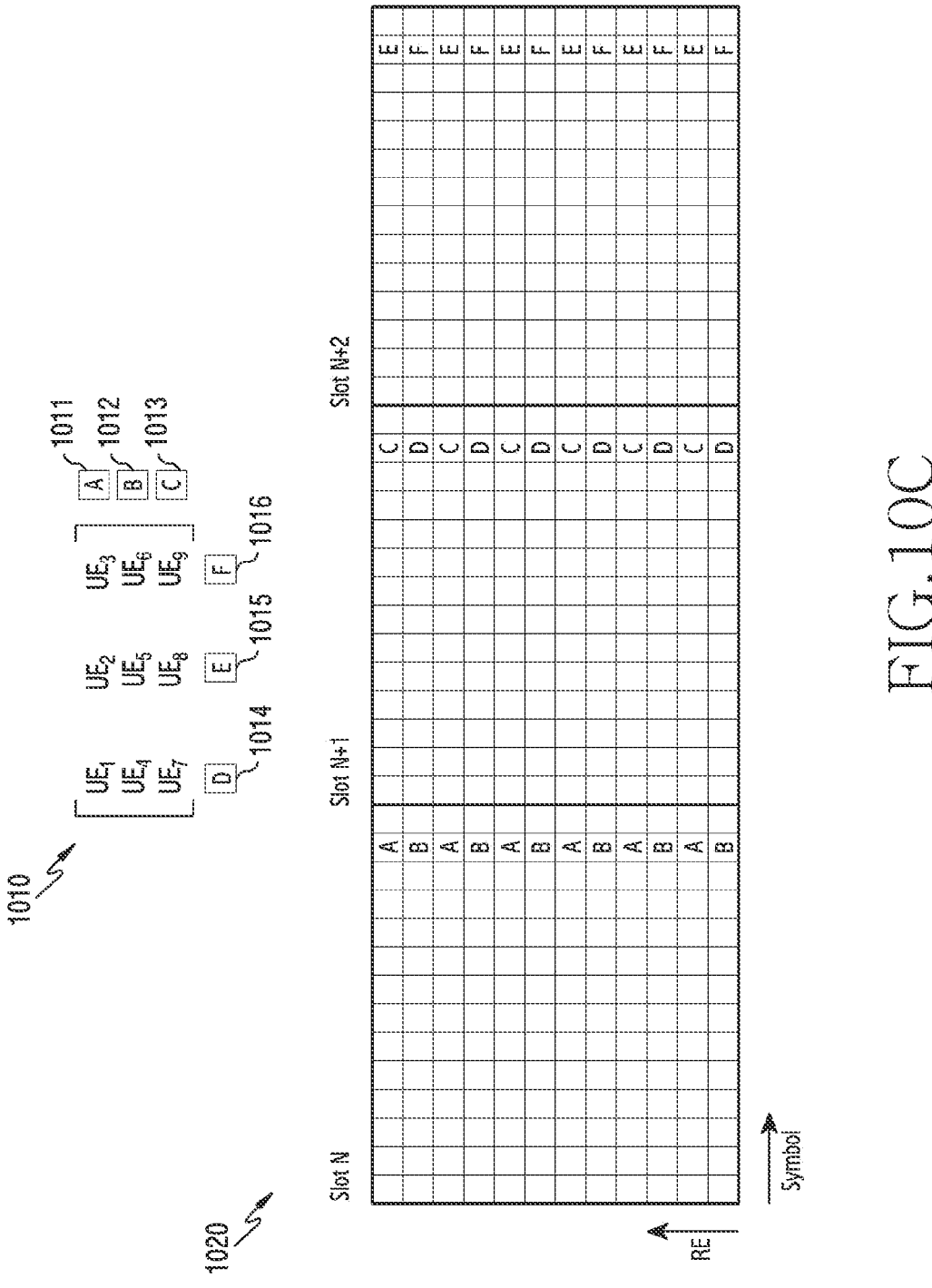
FIG. 10C is a view illustrating an example of determining a CLI-RS group according to an embodiment of the disclosure.

FIG. 10C illustrates an example of determining a CLI-RS group according to an embodiment of the disclosure. FIG. 10C illustrates an example in which the base station described in FIG. 10A determines an individual CLI-RS group configured for each CLI-RS transmission terminal. Specifically, as described in FIG. 10A, the base station may divide a plurality of CLI-RS resources into groups not to overlap one another, and for example, the base station may use a matrix-based CLI-RS group allocation technique.

According to an embodiment, when n×n or n×m CLI-RS transmission terminals are determined with reference to a matrix 1010 shown in FIG. 10C, each terminal may be disposed in each element of the matrix. In addition, the base station may arrange individual CLI-RS resources 1011 to 1016 corresponding to respective rows and columns. That is, the base station may determine and allocate a CLI-RS group to have CLI-RS resources on a row and a column corresponding to each of the terminals arranged in the matrix 1010.

For example, when 3×3 CLI-RS transmission terminals are assumed, the base station may allocate CLI-RS resources by utilizing 6 CLI-RS resources A 1011, B 1012, C 1013, D 1014, E 1015, F 1016 of the matrix 1010, such that terminals UE 1, UE 2, UE 3, UE 4, UE 5, UE 6, UE 7, UE 8, UE 9 have different groups. That is, the base station may allocate CLI-RS groups that do not overlap one another to the respective terminals. For example, the base station may allocate a CLI-RS group {A, D} corresponding to the CLI-RS resources A 1011 and D 1014 to UE 1, and may allocate a CLI-RS group {B, F} corresponding to the CLI-RS resources B 1012 and F 1016 to UE 6.

According to an embodiment, more specifically, the terminals may be allocated common CLI-RS resources on every row and every column as shown in the matrix 1010. Accordingly, when the base station defines CLI-RS groups that are determined to be allocated to the respective terminals according to the example of the matrix 1010, the CLI-RS groups allocated to the respective terminals may be UE 1 {A, D}/UE 2 {A, E}/UE 3 {A, F}/UE 4 {B, D}/UE 5 {B, E}/UE 6 {B, F}/UE 7 {C, D}/UE 8 {C, E}/UE 9 {C, F}. That is, the CLI-RS groups allocated to the respective terminals may not correspond to subsets of one another, and may not overlap one another. In addition, the universal set of the CLI-RS groups may be {A, B, C, D, E, F}. Accordingly, the base station and the CLI measurement terminal may understand a position of a resource for transmitting a CLI-RS based on the universal set of the CLI-RS groups, and may operate.

Referring to FIG. 10C, an example 1020 of a resource grid that is used by each CLI-RS transmission terminal allocated a CLI-RS group based on the matrix 1010 is illustrated. For example, symbol 13 of slot N may include resources for CLI-RS resource A 1011 and CLI-RS resource B 1012, symbol 13 of slot N+1 may include resources for CLI-RS resource C 1013 and CLI-RS resource D 1014, and symbol 13 of slot N+2 may include resources for CLI-RS resource E 1015 and CLI-RS resource F 1016. The terminal 8 allocated the CLI-RS group {C, E} may transmit a CLI-RS by using resources corresponding to C among the resources included in slot N+1 and resources corresponding to E among the resources included in slot N+2. In addition, the CLI-RS resources may be independently divided by a time, a frequency, a code area, a sequence, etc., and an individual CLI-RS corresponding to each CLI-RS resource may be transmitted and received through each terminal and a transceiver of the terminal According to various embodiments of the disclosure, occurrence of an overhead caused by CLI-RS measurement may be reduced through determination of the CLI-RS group based on the matrix of FIG. 10C. More specifically, when the number of CLI-RS transmission terminals is M×M, the CLI measurement terminal should perform CLI-RS measurement M×M times in order to measure CLIs for the CLI-RS transmission terminals. According to an embodiment, when CLI measurement is performed according to a CLI-RS group that is determined based on an M×M matrix, the CLI measurement terminal may exactly identify a terminal that causes a CLI through 2M CLI-RS resources. That is, according to an embodiment, when a CLI-RS group is determined based on a matrix, an overhead caused by CLI measurement may be reduced from M×M to 2M.

However, determining the CLI-RS group as described above is merely an example according to various embodiments of the disclosure, and is not limited thereto. When the number of CLI-RS transmission terminal is smaller than 9, the base station may determine a CLI-RS group by using a 3×3 matrix having a blank element. The base station may determine a CLI-RS group by allocating CLI-RS resources through rows and columns regardless of the number of CLI-RS transmission terminals. In addition, FIGS. 10A to 10C illustrates only the 3×3 matrix, but according to various embodiments, the above-described CLI-RS group may be determined not only based on an M×M matrix, but also based on an M×N×L matrix. For example, when the number of CLI-RS transmission terminals is 6, a CLI-RS group for each terminal may be determined based on a 3×2 matrix or a 2×3 matrix, and for more exact CLI-RS measurement, CLI-RS resources may be allocated through respective axes based on an M×N×L matrix (M, N, and L include the same value).

Figure 11:
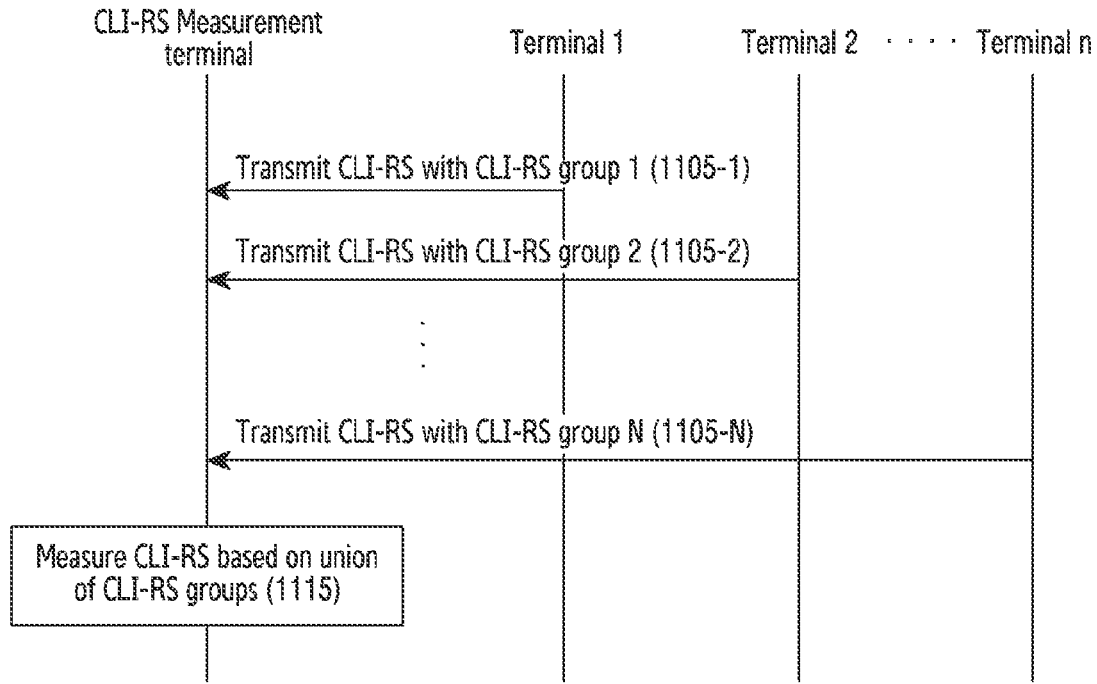
FIG. 11 is a view illustrating a flow of a signal for measuring a CLI-RS between a CLI measurement terminal and CLI-RS transmission terminals according to an embodiment of the disclosure.

FIG. 11 illustrates a flow of a signal for measuring a CLI-RS between a CLI measurement terminal and CLI-RS transmission terminals according to an embodiment of the disclosure. More specifically, the CLI-RS transmission terminals may transmit CLI-RSs based on CLI-RS groups allocated thereto.

At operations 1105-1, 1105-2, to 1105-N, the CLI-RS transmission terminals may transmit CLI-RSs to the CLI measurement terminal based on CLI-RS groups allocated thereto. That is, terminals 1 to n may transmit CLI-RSs on CLI-RS resources included in CLI-RS groups allocated thereto. According to an embodiment, when a matrix-based CLI-RS group is configured, the CLI-RS transmission terminals may use CLI-RS resources allocated for every row and every column as described in FIG. 10C in common. In this case, it may be assumed that a transmit power per CLI-RS resource is a power level like a physical uplink shared channel (PUSCH).

At operation 1115, the CLI measurement terminal may measure CLI-RSS received from the CLI-RS transmission terminals. More specifically, the CLI measurement terminal may measure CLI-RSs received from the respective terminals, based on a universal set of CLI-RS groups obtained from a base station.

According to an embodiment, the CLI (or CLI-RS) measurement terminal may measure a CLI (or CLI-RS) by adding up sizes of CLI-RSs with respect to each CLI-RS resource. For example, in the example of allocation illustrated in FIG. 10C, the CLI measurement terminal may measure an aggregated CLI of terminal 1, terminal 2, terminal 3 on the CLI-RS resource A, and may measure an aggregated CLI of terminal 4, terminal 5, terminal 6 on the CLI-RS resource B. Thereafter, the CLI-RS measurement terminal may identify a CLI-RS that exceeds a specific threshold value, based on a value of the measured CLI-RS reception size. That is, the CLI measurement terminal may compare RXP_a, RXP_b, RXP_c, RXP_d, RXP_e, RXP_f, which is a received power value received on each resource, and y which is a CLI received power level threshold value, and may identify at least one CLI-RS resource that has a CLI exceeding the threshold value. According to an embodiment, when even one of the CLI-RS transmission terminals causes a CLI exceeding a specific threshold value, a received power value exceeding the CLI received power level threshold value may be detected from at least one CLI-RS resource transmitted by the corresponding terminal. According to an embodiment, a value measured on a CLI-RS resource or a CLI threshold value for comparing with the corresponding value may include not only a received power value but also various values indicating signal quality.

According to an embodiment, after that, the CLI (or CLI-RS) measurement terminal may include, in measurement result information, identifiers (IDs) of the plurality of measured CLI-RS resources and received power values corresponding thereto, or an ID of the at least one CLI-RS resource identified as exceeding the CLI threshold value, and may report the measurement result information to the base station. For example, the CLI measurement terminal may directly deliver, to the base station, information on a CLI size that is measured on each CLI-RS resource based on CLI-RSs received from the CLI-RS transmission terminals. Alternatively, the CLI measurement terminal may deliver, to the base station, the ID of the at least one CLI-RS resource identified as exceeding the CLI threshold value. In this case, information on the CLI threshold value may be pre-configured for the terminals, or may be included in information received from the base station. For example, in the example of allocation illustrated in FIG. 10C, when terminal 1 is a terminal that causes a CLI by a threshold value or more, the CLI measurement terminal may report that CLI-RS resources A and D are CLI-RS resources exceeding the threshold value. The base station may identify, as terminal 1, a terminal that greatly influences the CLI (or CLI-RS) measurement terminal with a high CLI-RS, based on the reported information and information on the CLI-RS groups allocated to the respective terminals, and may perform co-scheduling for FD communication based on the identified terminal.

According to another embodiment, the CLI measurement terminal may identify a terminal that causes a CLI by a specific value or more, first, based on the at least one CLI-RS resource identified as exceeding the CLI threshold value, and universal set information of CLI-RS groups obtained from the base station, and may report the terminal to the base station. For example, in the example of allocation illustrated in FIG. 10C, when the CLI measurement terminal identifies that a CLI-RS transmitted on the CLI-RS resource A and the CLI-RS resource D has a received power greater than the CLI threshold value, the CLI measurement terminal which has already known that the group having resources A and D among the CLI-RS groups is a group allocated to terminal 1 may identify terminal 1 as a terminal causing a CLI. Thereafter, the CLI measurement terminal may report information on the terminal that is identified as causing a CLI exceeding a specific threshold value to the base station, and the base station may perform co-scheduling for FD communication based on the reported information.

Figure 12:
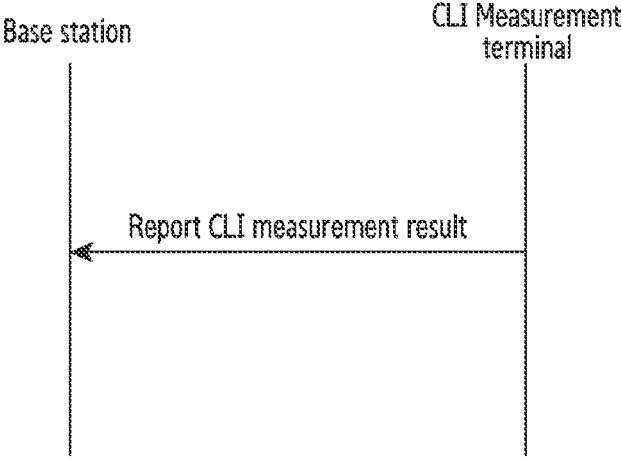
FIG. 12 is a view illustrating a flow of a signal for reporting a CLI measurement result between a base station and a CLI measurement terminal according to an embodiment of the disclosure.

FIG. 12 illustrates a flow of a signal for reporting a CLI measurement result between a base station and a CLI measurement terminal according to an embodiment of the disclosure.

Referring to FIG. 12, the CLI measurement terminal may report the CLI measurement result to the base station according to the CLI measuring operation described in FIG. 11.

According to an embodiment, the CLI measurement terminal may report information regarding an ID of a CLI-RS identified as having a higher size than a pre-defined CLI-RS measurement size (for example, a CLI threshold value) as a result of measuring a universal set of CLI-RS resources to the base station. For example, when a size of a CLI received power measured on CLI-RS resource A, CLI-RS resource B, and CLI-RS resource C among CLI-RS resources is higher than the CLI threshold value, the CLI measurement terminal may report a CLI-RS ID corresponding to CLI-RS resource A, CLI-RS resource B, and CLI-RS resource C to the base station. In this case, at least one of configuration information on respective CLI-RS resources, IDs corresponding to respective resources or information on locations of respective resources may be pre-configured in a terminal, or may be received from the base station. In addition, the terminal may report information on the ID of the CLI-RS resource the CLI received power size of which exceeds the CLI threshold value, or a value of a size of a received power measured on the corresponding CLI-RS resource to the base station. The base station may identify, as terminal 1, a terminal that greatly influences the CLI (or CLI-RS) measurement terminal with a high CLI-RS, based on the reported information and information on the CLI-RS groups allocated to the respective terminals, and may perform co-scheduling for FD communication based on the identified terminal.

According to an embodiment, the CLI measurement terminal may identify a terminal that causes a CLI by a specific value or more, first, based on the at least one CLI-RS resource identified as exceeding the CLI threshold value, and universal set information of CLI-RS groups obtained from the base station, and may report the terminal to the base station. In this case, at least one of configuration information on respective CLI-RS resources, IDs corresponding to CLI-RS groups, information on terminals to which CLI-RS resources included in a CLI-RS group are allocated in common, or information on locations of respective resources may be pre-configured in a terminal, or may be received from the base station. In addition, the CLI measurement terminal may report information on a terminal that is identified as causing a CLI exceeding a specific threshold value to the base station, based on the above-described information, and the base station may perform co-scheduling for FD communication based on the reported information.

According to various embodiments of the disclosure, the base station may measure a CLI for a terminal that has a signal quality value less than or equal to a specific value (for example, a terminal located on a coverage boundary of the base station), and then, may perform co-scheduling, so that efficiency of FD communication may be greatly enhanced.

According to various embodiments of the disclosure, a method performed by a base station in a wireless communication system may include: identifying a first terminal for measuring a CLI-RS and a plurality of terminals for transmitting CLI-RSs; determining a plurality of groups including at least one CLI-RS resource; transmitting, to the first terminal, information on the determined plurality of groups; transmitting, to a second terminal among the plurality of terminals, configuration information on a group of CLI-RS resources corresponding to the second terminal; and receiving, from the first terminal, a CLI measurement result which is measured based on the configuration information on the group of the CLI-RS resources.

According to an embodiment, the method may further include: transmitting a downlink signal to at least one terminal; receiving, from the at least one terminal, an RSRP measurement result which is based on the downlink signal; and, when an RSRP value of the downlink signal is less than or equal to an RSRP threshold value, identifying the at least one terminal as the first terminal for measuring the CLI-RS.

According to an embodiment, determining the plurality of groups including the at least one CLI-RS resource may include determining the plurality of groups such that groups of CLI-RS resources corresponding to the plurality of terminals for transmitting the CLI-RSs do not include one another.

According to an embodiment, determining the plurality of groups including the at least one CLI-RS resource may include: determining a matrix which has the plurality of terminals for transmitting the CLI-RSs as elements, different CLI-RS resources corresponding to rows and columns of the matrix; and determining the plurality of groups based on a row and a column corresponding to each of the plurality of terminals.

According to an embodiment, the CLI measurement result may include at least one of information on one or more CLI-RSs which are measured as exceeding a CLI threshold value, or information on one or more terminals which are determined as exceeding the CLI threshold value by the first terminal.

According to various embodiments of the disclosure, a method performed by a first terminal in a wireless communication system may include: receiving, from a base station, information on a plurality of groups including at least one CLI-RS resource; receiving, from a second terminal, a CLI-RS based on a group of CLI-RS resources corresponding to the second terminal; and transmitting a measurement result on the CLI-RS to the base station, and the first terminal may be a terminal for measuring a CLI and the second terminal may be one of a plurality of terminals for transmitting CLI-RSs.

According to an embodiment, the method may further include: receiving a downlink signal from the base station; and transmitting, to the base station, an RSRP measurement result which is based on the downlink signal, and an RSRP value of the downlink signal measured by the first terminal may be identified as being less than or equal to an RSRP threshold value.

According to an embodiment, the plurality of groups may be determined such that groups of CLI-RS resources corresponding to the plurality of terminals for transmitting the CLI-RSs do not include one another.

According to an embodiment, the plurality of groups may be determined based on a row and a column of a matrix which has the plurality of terminals for transmitting the CLI-RSs as elements, the row and column corresponding to each of the plurality of terminals, and different CLI-RS resources may correspond to the row and the column of the matrix.

According to an embodiment, the measurement result on the CLI-RS may include at least one of information on one or more CLI-RSs which are measured as exceeding a CLI threshold value, or information on one or more terminals which are determined as exceeding the CLI threshold value.

According to various embodiments of the disclosure, a base station in a wireless communication system may include: at least one transceiver; and a controller coupled with the at least one transceiver, and the controller may be configured to: identify a first terminal for measuring a CLI-RS and a plurality of terminals for transmitting CLI-RSs; determine a plurality of groups including at least one CLI-RS resource; transmit, to the first terminal, information on the determined plurality of groups; transmit, to a second terminal among the plurality of terminals, configuration information on a group of CLI-RS resources corresponding to the second terminal; and receive, from the first terminal, a CLI measurement result which is measured based on the configuration information on the group of the CLI-RS resources.

According to an embodiment, the controller may further be configured to: transmit a downlink signal to at least one terminal; receive, from the at least one terminal, an RSRP measurement result which is based on the downlink signal; and, when an RSRP value of the downlink signal is less than or equal to an RSRP threshold value, identify the at least one terminal as the first terminal for measuring the CLI-RS.

According to an embodiment, in order to determine the plurality of groups including the at least one CLI-RS resource, the controller may be configured to determine the plurality of groups such that groups of CLI-RS resources corresponding to the plurality of terminals for transmitting the CLI-RSs do not include one another.

According to an embodiment, in order to determine the plurality of groups including the at least one CLI-RS resource, the controller may be configured to: determine a matrix which has the plurality of terminals for transmitting the CLI-RSs as elements, different CLI-RS resources corresponding to rows and columns of the matrix; and determine the plurality of groups based on a row and a column corresponding to each of the plurality of terminals.

According to an embodiment, the CLI measurement result may include at least one of information on one or more CLI-RSs which are measured as exceeding a CLI threshold value, or information on one or more terminals which are determined as exceeding the CLI threshold value by the first terminal.

According to various embodiments of the disclosure, a first terminal in a wireless communication system may include: at least one transceiver; and a controller coupled with the at least one transceiver, and the controller may be configured to: receive, from a base station, information on a plurality of groups including at least one CLI-RS resource; receive, from a second terminal, a CLI-RS based on a group of CLI-RS resources corresponding to the second terminal; and transmit a measurement result on the CLI-RS to the base station, and the first terminal may be a terminal for measuring a CLI and the second terminal may be one of a plurality of terminals for transmitting CLI-RSs.

According to an embodiment, the controller may further be configured to: receive a downlink signal from the base station; and transmit, to the base station, an RSRP measurement result which is based on the downlink signal, and an RSRP value of the downlink signal measured by the first terminal may be identified as being less than or equal to an RSRP threshold value.

According to an embodiment, the plurality of groups may be determined such that groups of CLI-RS resources corresponding to the plurality of terminals for transmitting the CLI-RSs do not include one another.

According to an embodiment, the plurality of groups may be determined based on a row and a column of a matrix which has the plurality of terminals for transmitting the CLI-RSs as elements, the row and column corresponding to each of the plurality of terminals, and different CLI-RS resources may correspond to the row and the column of the matrix.

According to an embodiment, the measurement result on the CLI-RS may include at least one of information on one or more CLI-RSs which are measured as exceeding a CLI threshold value, or information on one or more terminals which are determined as exceeding the CLI threshold value.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
   determining a first terminal for measuring a cross-link interference (CLI)-reference signal (RS) and a plurality of terminals for transmitting CLI-RSs;
   determining a plurality of groups of CLI-RS resources;
   transmitting, to the first terminal, information on the plurality of groups of CLI-RS resources;
   transmitting, to a second terminal among the plurality of terminals, configuration information on a first group of CLI-RS resources allocated to the second terminal; and
   receiving, from the first terminal, a CLI measurement result measured based on the first group of CLI-RS resources,
   wherein the first group of CLI-RS resources does not overlap with a second group of CLI-RS resources among the plurality of groups in a time domain and a frequency domain, and
   wherein the second group of CLI-RS resources is allocated to a third terminal among the plurality of terminals.

2. The method of claim 1, further comprising:
   transmitting, to at least one terminal, a downlink signal;
   receiving, from the at least one terminal, a reference signal received power (RSRP) measurement result based on the downlink signal; and
   in case that an RSRP value of the downlink signal is less than or equal to an RSRP threshold value, identifying the at least one terminal as the first terminal for measuring the CLI-RS.

3. The method of claim 1, wherein the CLI measurement result includes at least one of information on one or more CLI-RSs which are measured as exceeding a CLI threshold value, or information on one or more terminals which are determined as exceeding the CLI threshold value by the first terminal.

4. A method performed by a first terminal in a wireless communication system, the method comprising:
   receiving, from a base station, information on a plurality of groups of cross-link interference (CLI)-reference signal (RS) resources;
   receiving, from a second terminal, a CLI-RS based on a first group of CLI-RS resources allocated to the second terminal; and
   transmitting, to the base station, a measurement result for the CLI-RS,
   wherein the first terminal is a terminal for measuring a CLI and the second terminal is one of a plurality of terminals for transmitting CLI-RSs,
   wherein the first group of CLI-RS resources does not overlap with a second group of CLI-RS resources among the plurality of groups in a time domain and a frequency domain, and
   wherein the second group of CLI-RS resources is allocated to a third terminal among the plurality of terminals.

5. The method of claim 4, further comprising:
   receiving, from the base station, a downlink signal; and
   transmitting, to the base station, a reference signal received power (RSRP) measurement result based on the downlink signal, wherein an RSRP value of the downlink signal measured by the first terminal is identified as being less than or equal to an RSRP threshold value.

6. The method of claim 4, wherein the measurement result on the CLI-RS includes at least one of information on one or more CLI-RSs which are measured as exceeding a CLI threshold value, or information on one or more terminals which are determined as exceeding the CLI threshold value.

7. A base station in a wireless communication system, the base station comprising:
a transceiver; and
a controller coupled with the transceiver, and configured to:
determine a first terminal for measuring a cross-link interference (CLI)-reference signal (RS) and a plurality of terminals for transmitting CLI-RSs,
determine a plurality of groups of CLI-RS resources,
transmit, to the first terminal, information on the plurality of groups of CLI-RS resources,
transmit, to a second terminal among the plurality of terminals, configuration information on a first group of CLI-RS resources allocated to the second terminal, and
receive, from the first terminal, a CLI measurement result measured based on the first group of CLI-RS resources,
wherein the first group of CLI-RS resources does not overlap with a second group of CLI-RS resources among the plurality of groups in a time domain and a frequency domain, and
wherein the second group of CLI-RS resources is allocated to a third terminal among the plurality of terminals.

8. The base station of claim 7, wherein the controller is further configured to:
transmit, to at least one terminal a downlink signal,
receive, from the at least one terminal, a reference signal received power (RSRP) measurement result based on the downlink signal, and
in case that an RSRP value of the downlink signal is less than or equal to an RSRP threshold value, identify the at least one terminal as the first terminal for measuring the CLI-RS.

9. The base station of claim 7, wherein the CLI measurement result includes at least one of information on one or more CLI-RSs which are measured as exceeding a CLI threshold value, or information on one or more terminals which are determined as exceeding the CLI threshold value by the first terminal.

10. A first terminal in a wireless communication system, the first terminal comprising:
a transceiver; and
a controller coupled with the transceiver, and configured to:
receive, from a base station, information on a plurality of groups of cross-link interference (CLI)-reference signal (RS) resources,
receive, from a second terminal, a CLI-RS based on a first group of CLI-RS resources allocated to the second terminal, and
transmit, to the base station, a measurement result for the CLI-RS, and
wherein the first terminal is a terminal for measuring a CLI and the second terminal is one of a plurality of terminals for transmitting CLI-RSs,
wherein the first group of CLI-RS resources does not overlap with a second group of CLI-RS resources among the plurality of groups in a time domain and a frequency domain, and
wherein the second group of CLI-RS resources is allocated to a third terminal among the plurality of terminals.

11. The first terminal of claim 10,
wherein the controller is further configured to:
receive, from the base station, a downlink signal, and
transmit, to the base station, a reference signal received power (RSRP) measurement result based on the downlink signal, and
wherein an RSRP value of the downlink signal measured by the first terminal is identified as being less than or equal to an RSRP threshold value.

12. The first terminal of claim 10, wherein the measurement result on the CLI-RS includes at least one of information on one or more CLI-RSs which are measured as exceeding a CLI threshold value, or information on one or more terminals which are determined as exceeding the CLI threshold value.

*    *    *    *    *